(12) United States Patent
Yamaguchi et al.

(10) Patent No.: US 8,564,838 B2
(45) Date of Patent: Oct. 22, 2013

(54) IMAGE PROCESSING APPARATUS AND METHOD FOR DETERMINING ARRANGEMENT OF DOT COUNT OR RECORDING MATERIAL AMOUNT BY ERROR DIFFUSION PROCESS

(75) Inventors: Arata Yamaguchi, Tokyo (JP); Hiroaki Sagae, Tokyo (JP); Takashi Kimura, Kanagawa (JP); Masakazu Yoshida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 299 days.

(21) Appl. No.: 13/119,368

(22) PCT Filed: Sep. 14, 2009

(86) PCT No.: PCT/JP2009/066471
§ 371 (c)(1),
(2), (4) Date: Mar. 16, 2011

(87) PCT Pub. No.: WO2010/032859
PCT Pub. Date: Mar. 25, 2010

(65) Prior Publication Data
US 2011/0170141 A1    Jul. 14, 2011

(30) Foreign Application Priority Data

Sep. 16, 2008  (JP) ................................ 2008-236352
Jul. 2, 2009  (JP) ................................ 2009-158123

(51) Int. Cl.
*H04N 1/40* (2006.01)

(52) U.S. Cl.
USPC ........ 358/3.05; 358/3.03; 358/3.04; 382/162; 382/166; 382/167

(58) Field of Classification Search
None
See application file for complete search history.

(56) References Cited

U.S. PATENT DOCUMENTS 4,893,177 A   1/1990  Tada et al.
5,031,050 A   7/1991  Chan
(Continued)

FOREIGN PATENT DOCUMENTS

JP    9 286124    11/1997
JP    2003 110861   4/2003
(Continued)

OTHER PUBLICATIONS

Floyd, R. et al., "An Adaptive Algorithm for Spatial Gray Scale", SID International Symposium Digest of Technical Papers, vol. 4.3, pp. 36 and 37 (Apr. 1975).

(Continued)

*Primary Examiner* — Dung Tran
(74) *Attorney, Agent, or Firm* — Oblon, Spivak, McClelland, Maier & Neustadt, L.L.P.

(57) ABSTRACT

An image processing apparatus quantizes multi-level image data of n colors, where n≥2, by performing an error diffusion processing. The image processing apparatus includes: a dot arrangement determining unit that determines either one of an essential dot count and an essential recording material amount when the multi-level image data of n colors is converted into multi-level image data of m colors, where n>m≥1, by the error diffusion processing; and a color arrangement determining unit that performs the error diffusion processing on each color component of the multi-level image data of n colors, calculates either one of a dot count and a recording material amount for each color component, and determines an arrangement of either one of the dot count and the recording material amount for each color component within a range of a corresponding one of the essential dot count and the essential recording material amount determined by the dot arrangement determining unit.

8 Claims, 16 Drawing Sheets

(56) References Cited

U.S. PATENT DOCUMENTS

| | | | |
|---|---|---|---|
| 7,924,465 B2 * | 4/2011 | Ike et al. ............... 358/3.06 |
| 7,957,031 B2 * | 6/2011 | Kakutani ............... 358/3.01 |
| 2004/0218220 A1 * | 11/2004 | Thompson et al. ...... 358/3.03 |
| 2006/0098045 A1 | 5/2006 | Mizutani et al. |
| 2006/0274374 A1 | 12/2006 | Murakami |
| 2007/0085869 A1 | 4/2007 | Hirano et al. |
| 2007/0097164 A1 | 5/2007 | Marumoto |
| 2007/0106962 A1 * | 5/2007 | Sakakibara et al. ........... 716/1 |
| 2007/0109604 A1 | 5/2007 | Marumoto |

FOREIGN PATENT DOCUMENTS

| JP | 3466664 | 11/2003 |
| JP | 2004 186724 | 7/2004 |
| JP | 3732470 | 1/2006 |
| JP | 2006 50596 | 2/2006 |
| JP | 2007 6391 | 1/2007 |
| JP | 2007 137049 | 6/2007 |
| JP | 4086410 | 5/2008 |
| JP | 2008 207385 | 9/2008 |

OTHER PUBLICATIONS

International Search Report Issued Dec. 8, 2009 in PCT/JP09/066471 filed Sep. 14, 2009.

International Search Report mailed Aug. 12, 2009, in PCT/JP2009/066471 filed Sep. 14, 2009.

International Written Opinion mailed Aug. 12, 2009, in PCT/JP2009/066471 filed Sep. 14, 2009.

Extended European Search Report issued May 3, 2013 in Patent Application No. 09814703.6.

* cited by examiner

HEAD MOVING DIRECTION
(MAIN-SCANNING DIRECTION)

PAPER DISCHARGING DIRECTION
(SUB-SCANNING DIRECTION)

FIG.10

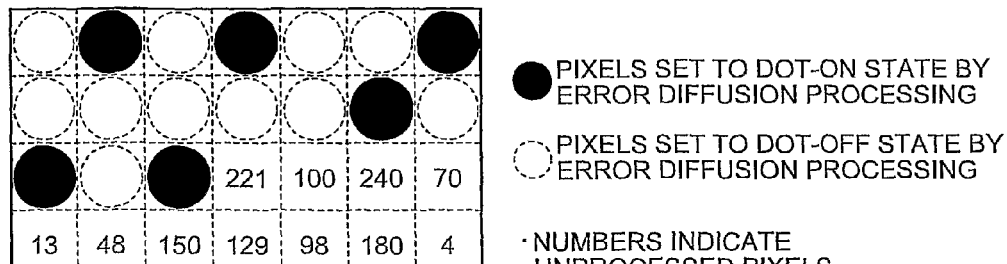

● PIXELS SET TO DOT-ON STATE BY ERROR DIFFUSION PROCESSING

○ PIXELS SET TO DOT-OFF STATE BY ERROR DIFFUSION PROCESSING

· NUMBERS INDICATE UNPROCESSED PIXELS $e_{xy}$: ERROR GENERATED IN THRESHOLD PROCESSING

 INDICATES TARGET PIXEL FOR SUBSEQUENT ERROR DIFFUSION PROCESSING

MULTIPLY ERROR VALUE OF ALREADY-PROCESSED SURROUNDING PIXELS BY WEIGHT GIVEN BELOW AND CALCULATE CORRECTION PIXEL VALUE BY ADDING MULTIPLICATION RESULT TO VALUE OF TARGET PIXEL FOR SUBSEQUENT PROCESSING

ERROR WEIGHT MATRIX $$\frac{1}{48} \times \begin{array}{|c|c|c|c|c|} \hline 1 & 3 & 5 & 3 & 1 \\ \hline 3 & 5 & 7 & 5 & 3 \\ \hline 5 & 7 & * & & \\ \hline \end{array}$$

*INDICATES POSITION OF TARGET PIXEL FOR SUBSEQUENT ERROR DIFFUSION PROCESSING

CORRECTION PIXEL VALUE = $221 + \frac{1}{48}e_{10} + \frac{3}{48}e_{20} + \frac{5}{48}e_{30} + \cdots + \frac{7}{48}e_{13}$ COMPARE FIXED (VARIABLE) THRESHOLD VALUE AND CALCULATE DOT ON/OFF AND ERROR VALUE ($e_{xy}$) (FOR 255=BETA, 0=SOLID)

IF CORRECTION PIXEL VALUE>THRESHOLD VALUE
    $e_{xy}$=CORRECTION PIXEL VALUE−255   ...DOT-ON STATE
ELSE
    $e_{xy}$=CORRECTION PIXEL VALUE          ...DOT-OFF STATE

CONVENTIONAL ERROR DIFFUSION PROCESSING

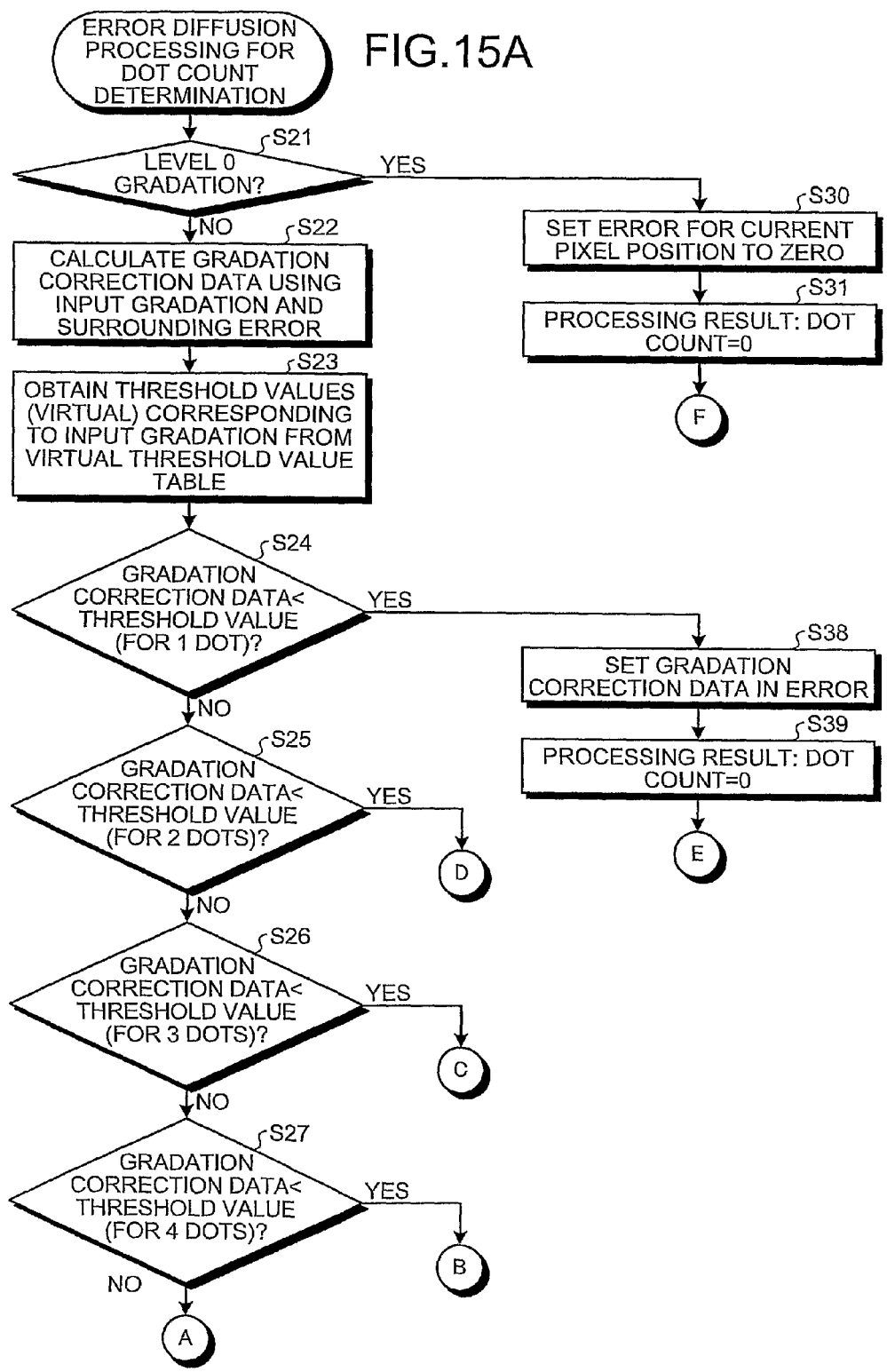

VIRTUAL THRESHOLD VALUE TABLE

ESSENTIAL DOT COUNT

GRADATION CORRECTION DATA (vertical axis)

GRADATION CORRESPONDING TO ONE-DIMENSIONAL ERROR DIFFUSION PROCESSING

| TARGET PIXEL (ESSENTIAL DOT COUNT=3) | | | |
|---|---|---|---|
| | GRADATION CORRECTION DATA | THRESHOLD ARRIVAL FACTOR | DOT DIAMETER (THRESHOLD VALUE) |
| C | 240 | 100 | LARGE (240) |
| M | 226 | 90 | LARGE (240) |
| Y | 63 | 70 | SMALL (90) |
| K | 108 | 60 | MEDIUM (180) |

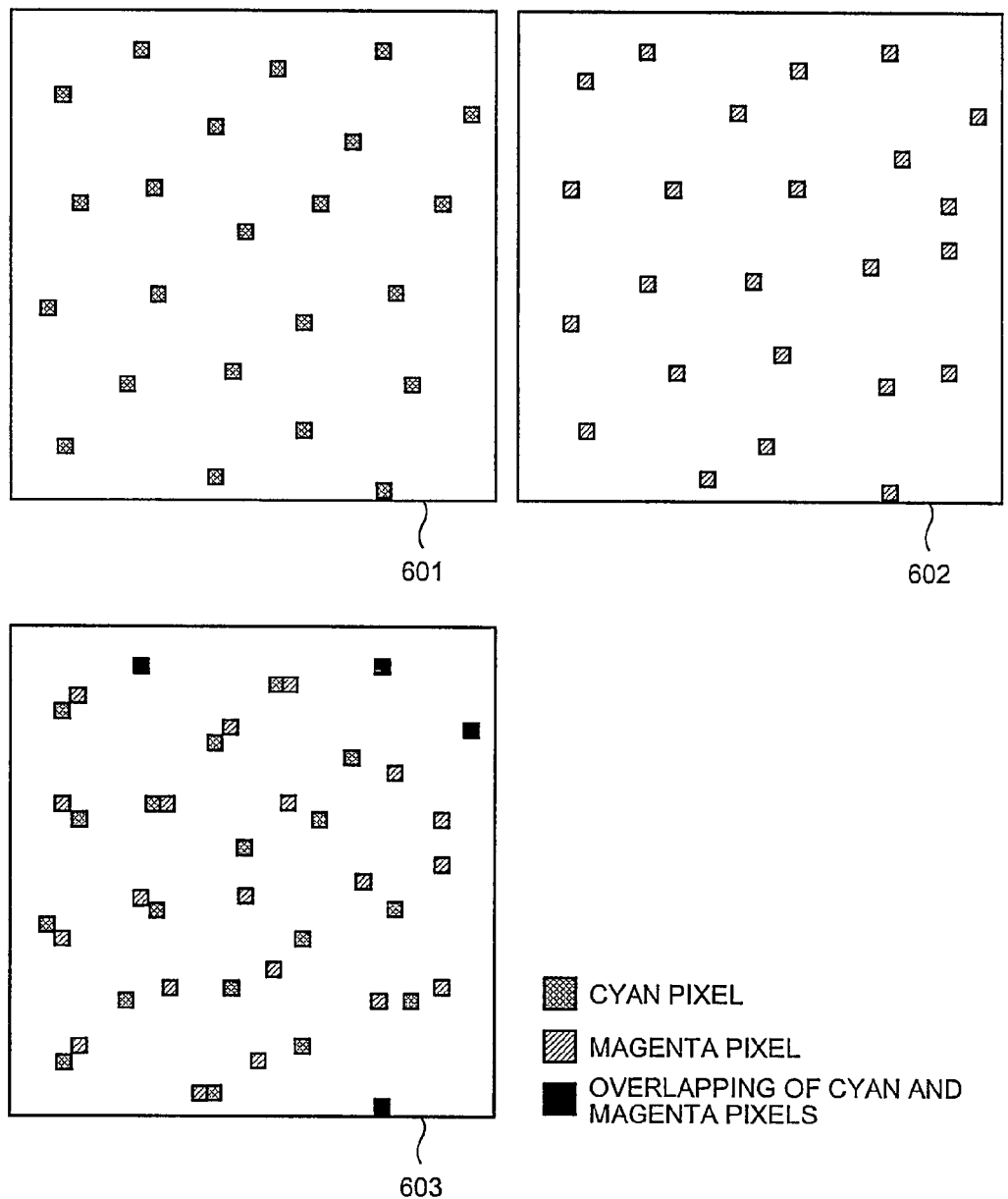

IMAGE PROCESSING APPARATUS AND METHOD FOR DETERMINING ARRANGEMENT OF DOT COUNT OR RECORDING MATERIAL AMOUNT BY ERROR DIFFUSION PROCESS

TECHNICAL FIELD

The present invention relates to an image processing apparatus, an image processing method, and a computer program product for processing an image.

BACKGROUND ART

The inkjet recording techniques have been drawing attention as suitable recording techniques for office use. That is because, firstly, inkjet recording can be performed at a high speed. Secondly, inkjet recording can be performed on a sheet of plain paper without having to perform any specific image fixing process. Thirdly, the noise generated during inkjet recording is sufficiently small so that it can be ignored. A variety of inkjet recording techniques have been disclosed and some have already been commercialized for actual use. An inkjet recording technique makes use of an inkjet head that includes an ink liquid room and a series of nozzles connected to the ink liquid room. Depending on image data, certain pressure is applied to the ink in the ink liquid room. Consequently, small ink dots are discharged through the nozzles on a recording member such as paper or a film. The discharged ink dots get attached to the recording member whereby an image is formed on the recording member. Depending on the configuration of the inkjet head, an inkjet printer can be classified as a serial inkjet printer or a line inkjet printer. A serial inkjet printer forms an image by moving the inkjet head across the width direction of the paper sheet (main-scanning) and advancing the paper sheet after completion of one or more scanning to form the subsequent recording line. On the other hand, in a line inkjet printer, the nozzles are arranged over substantially the entire region along the width direction of the paper sheet. In that case, the inkjet head does not move along the width direction. Rather, an image is formed while advancing the paper sheet beneath the inkjet head. Since a line inkjet printer can form a single recording line in the width direction at once, a high-speed recording can be obtained. However, because of the nozzle arrangement over substantially the entire region along the width direction of the paper sheet, the size of the inkjet head increases. That causes an increase in the size of the line inkjet printer. Moreover, to perform high-resolution recording in a line inkjet printer, the nozzles need to be arranged in a precise manner in the inkjet head. That leads to an increase in the manufacturing cost of the inkjet head. In comparison, a serial inkjet printer can form an image with a relatively smaller inkjet head thereby enabling achieving reduction in the manufacturing cost. That is why, at present, a variety of commercialized serial inkjet printers are available in the market.

Typically, an inkjet recording apparatus outputs an output image either in the three subtractive primary color components of cyan (C), magenta (M), and yellow (Y) or in four color components by generating black (K) from the three subtractive primary color components. To output such an output image, the three color components of red (R), green (G), and blue (B) of input image data are first converted into CMY image data or CMYK image data, which is multi-level image data. Then, the multi-level image data is converted into two-valued image data by pseudo-halftone processing and the output image is formed with the use of a recording material of each color component.

To convert the multi-level image data into two-valued image data, an error diffusion technique can be employed as described in "An adaptive algorithm for spatial gray scale" by R. Floyd et al., SID International Symposium Digest of Technical Papers, vol 4.3, 1975, pp. 36-37. In that error diffusion technique, quantization error generated in a particular pixel is diffused over a plurality of subsequent pixels to express gradation in a pseudo manner. Moreover, while performing pseudo-halftone processing on CMYK multi-level image data, error diffusion processing according to the abovementioned error diffusion technique is performed independently for each color component of cyan (C), magenta (M), yellow (Y), and black (K). As a result, the generated two-valued image of each color component has superior visual quality. However, if two or more color components are synthesized, then the output is not necessarily of acceptable quality from a visual perspective.

FIG. 19 is a schematic diagram depicting a two-valued image 601 of cyan pixels, a two-valued image 602 of magenta pixels, and a two-valued image 603 generated by synthesizing the cyan pixels and the magenta pixels. Each of the two-valued images 601 and 602 is formed by performing the error diffusion processing on image data having a uniform pixel value. Thus, the pixels in each of the two-valued images 601 and 602 are evenly spaced apart from each other. That enhances the visual quality of the two-valued images 601 and 602. In comparison, the two-valued image 603 is generated by synthesizing the cyan pixels and the magenta pixels in the two-valued images 601 and 602, respectively. However, since the pixel positions of the cyan pixels and the magenta pixels have no correlation, the cyan pixels and the magenta pixels are not evenly spaced apart in the two-valued image 603. Moreover, overlapping of pixels (cyan pixels and magenta pixels) can be observed even in the regions where only few pixels are present. Thus, it cannot be said that the two-valued image 603 is good in visual quality.

To guard against such a problem, Japanese Patent Application Laid-open No. 2007-6391 discloses a technique of performing error diffusion processing on the total pixel value calculated by adding the individual pixel values and then optimally arranging the dots in, for example, the descending order of dot diameter or dot density).

However, due to dot gain or developing characteristics in electrophotography, the pixel values and the dot count/the quantity of recording material do not necessarily have a correlation. Thus, in the technique disclosed in Japanese Patent Application Laid-open No. 2007-6391, there are times when a dot arrangement of an optimal dot count/optimal quantity of recording material is not achieved.

The present invention has been made to solve the above problems in the conventional technology and it is an object of the present invention to provide a technology that enables achieving optimal diffusion in dot arrangement of all color components in multi-level image data of two or more colors and preventing color overlapping for each color component.

DISCLOSURE OF INVENTION

According to one aspect of the present invention, there is provided an image processing apparatus that quantizes multi-level image data of n colors, where n≥2, by an error diffusion processing. The image processing apparatus includes: a dot arrangement determining unit that determines either one of an essential dot count and an essential recording material amount when the multi-level image data of n colors is converted into multi-level image data of m colors, where n>m≥1, by the error diffusion processing; and a color arrangement determining unit that performs the error diffusion processing on each color component of the multi-level image data of n colors, calculates either one of a dot count and a recording material amount for each color component, and determines an arrangement of either one of the dot count and the recording material amount for each color component within a range of a corresponding one of the essential dot count and the essential recording material amount determined by the dot arrangement determining unit.

Furthermore, according to another aspect of the present invention, there is provided an image processing method of quantizing multi-level image data of n colors, where n≥2, by an error diffusion processing. The image processing method includes: dot arrangement determining including determining either one of an essential dot count and an essential recording material amount when the multi-level image data of n colors is converted into multi-level image data of m colors, where n>m≥1, by the error diffusion processing; and color arrangement determining including performing the error diffusion processing on each color component of the multi-level image data of n colors, calculating either one of a dot count and a recording material amount for each color component, and determining an arrangement of either one of the dot count and the recording material amount for each color component within a range of a corresponding one of the essential dot count and the essential recording material amount determined at the dot arrangement determining.

Moreover, according to still another aspect of the present invention, there is provided a computer program product including a computer-usable medium having computer-readable program codes embodied in the medium for quantizing multi-level image data of n colors, where n≥2, by an error diffusion processing. The program codes when executed cause a computer to execute: dot arrangement determining including determining either one of an essential dot count and an essential recording material amount when the multi-level image data of n colors is converted into multi-level image data of m colors, where n>m≥1, by the error diffusion processing; and color arrangement determining including performing the error diffusion processing on each color component of the multi-level image data of n colors, calculating either one of a dot count and a recording material amount for each color component, and determining an arrangement of either one of the dot count and the recording material amount for each color component within a range of a corresponding one of the essential dot count and the essential recording material amount determined at the dot arrangement determining.

BRIEF DESCRIPTION OF DRAWINGS

FIG. 10 is a schematic diagram for explaining halftone processing performed using error diffusion processing.

FIGS. 15A and 15B are flowcharts for explaining the error diffusion processing shown in FIG. 13 to enable dot arrangement determination.

FIG. 19 is a schematic diagram for explaining a conventional technology.

BEST MODE(S) FOR CARRYING OUT THE INVENTION

Exemplary embodiments of the present invention are described in detail below with reference to the accompanying drawings. The present invention is not limited to these exemplary embodiments. Regarding the constituent elements described in the exemplary embodiments, various alternatives and modifications that fairly fall within the basic teaching herein set forth can be devised by those skilled in the art.

Figure 1:
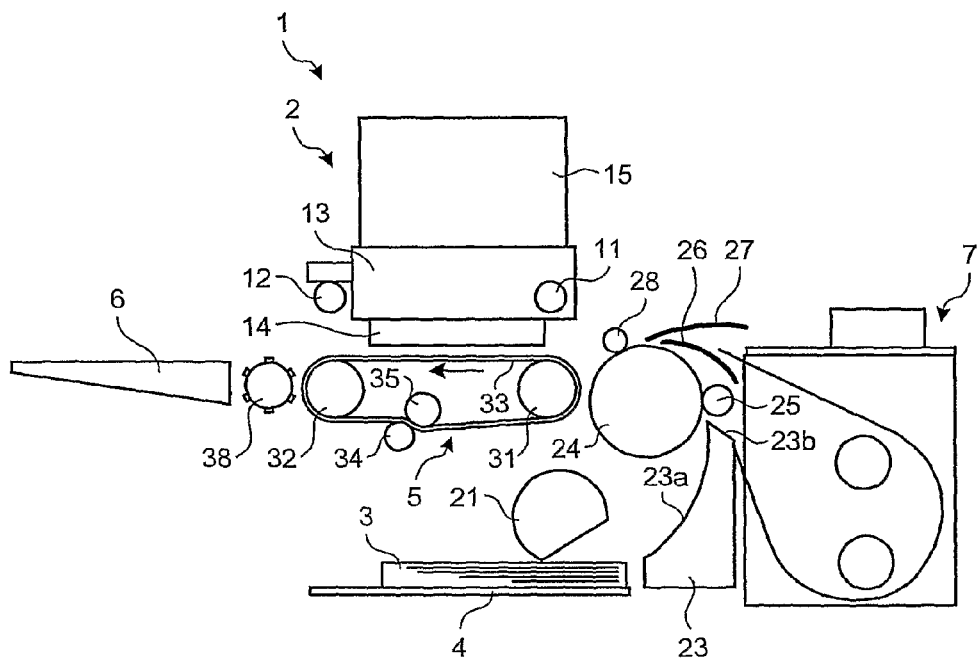
FIG. 1 is a schematic diagram of an exemplary functional configuration of an inkjet recording apparatus according to an embodiment of the present invention.
Figure 2:
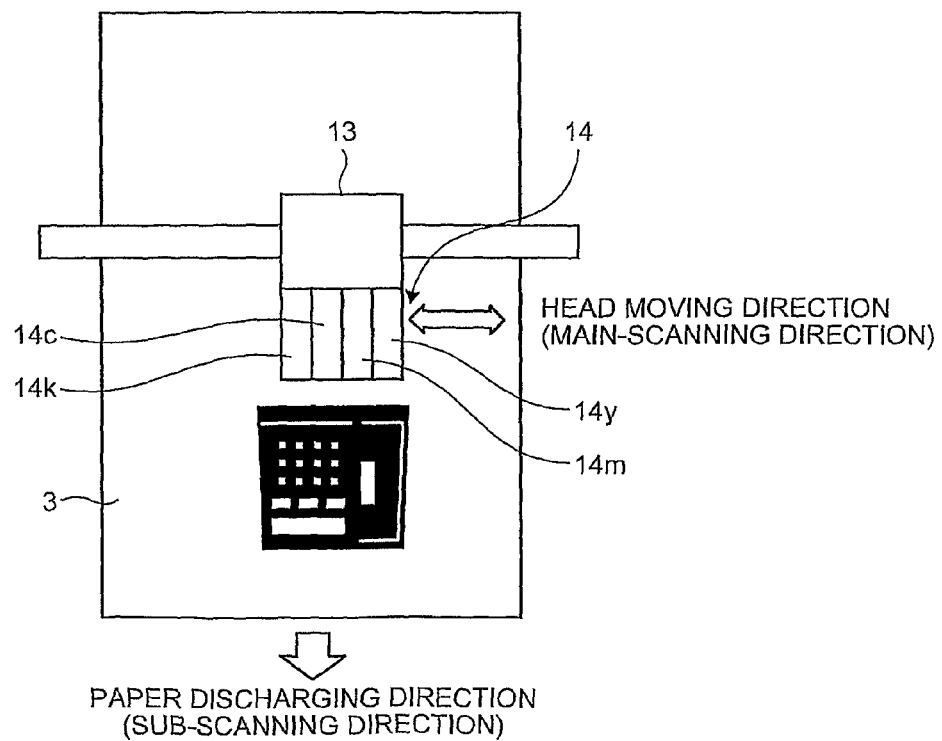
FIG. 2 is a plan view of essential parts of the inkjet recording apparatus.
Figure 3:
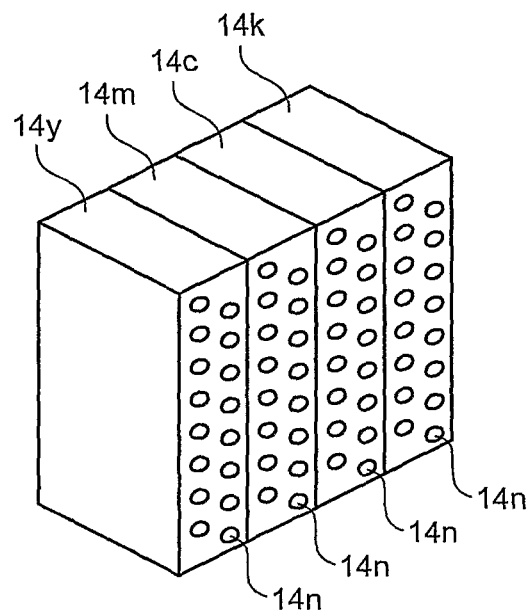
FIG. 3 is a perspective view of an exemplary configuration of a recording head in the inkjet recording apparatus.
Figure 4:
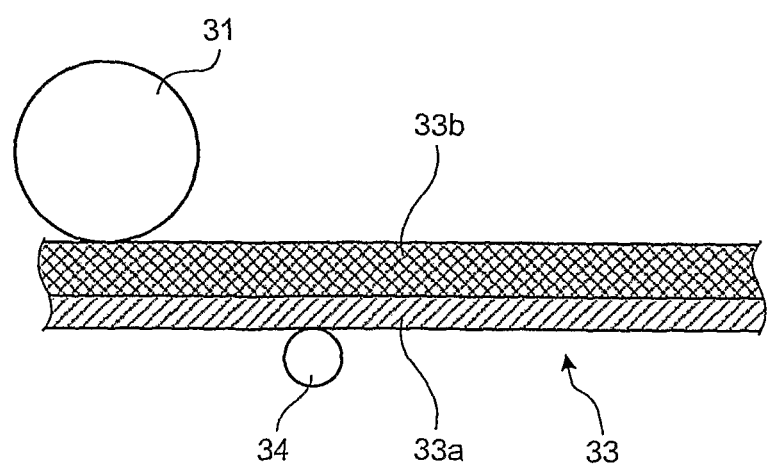
FIG. 4 is a cross-sectional view of a conveying belt in the inkjet recording apparatus.

Given below is the description of an exemplary inkjet recording apparatus according to an embodiment of the present invention with reference to FIGS. 1 to 4. The inkjet recording apparatus according to the present embodiment is an image forming apparatus (also referred to as an image processing apparatus) that can perform bidirectional printing. FIG. 1 is a schematic diagram of an exemplary functional configuration of the inkjet recording apparatus. FIG. 2 is a plan view of essential parts of the inkjet recording apparatus. FIG. 3 is a perspective view of an exemplary configuration of a recording head in the inkjet recording apparatus. FIG. 4 is a cross-sectional view of a conveying belt in the inkjet recording apparatus.

The inkjet recording apparatus shown in FIG. 1 has a main body 1 inside which an image forming unit 2 is disposed. A paper feeding tray 4 is disposed in the bottom part of the main body 1. The paper feeding tray 4 can be stacked with a plurality of sheets 3 of a recording medium such as paper (hereinafter, "paper sheets 3"). A conveying unit 5 conveys the paper sheets 3 fed one by one by the paper feeding tray 4 to the image forming unit 2. The image forming unit 2 forms a predetermined image on each conveyed paper sheet 3 and discharges that paper sheet 3 to a catch tray 6, which is attached to a lateral side of the main body 1.

A two-side unit 7 that is used in duplex printing is attached to the main body 1 in a detachable manner. In the case of duplex printing, when an image is formed on a first side of a paper sheet 3, the conveying unit 5 conveys the print sheet 3 in the reverse direction to the two-side unit 7. Then, the two-side unit 7 reverses the paper sheet 3 and sends it back to the conveying unit 5. Subsequently, the image forming unit 2 forms an image on a second side of the paper sheet 3 and discharges it to the catch tray 6.

The image forming unit 2 slidably holds a carriage 13 on two guide shafts 11 and 12. A main-scanning motor (described later) is used to move (main-scan) the carriage 13 in the direction orthogonal to the conveying direction of the paper sheets 3. On the carriage 13 is disposed a recording head 14 that includes a plurality of inkjet heads. Each inkjet head is formed by arranging a plurality of discharging nozzles 14n though which ink droplets are discharged (see FIG. 3). An ink cartridge 15 is disposed in a detachable manner to supply liquid ink to the recording head 14. Alternatively, a sub-tank can be disposed to supply liquid ink to the recording head 14. In that case, the sub-tank can be refilled by using a main tank.

As shown in FIGS. 2 and 3, the recording head 14 includes four independent inkjet heads 14y, 14m, 14c, and 14k that respectively discharge ink droplets of yellow (Y), magenta (M), cyan (C), and black (K) color components. As an alternative configuration, it is also possible to dispose one or more recording heads each including a plurality of nozzles though which ink droplets of each color component are discharged. Meanwhile, the number of color components dischargable from recording heads or the arrangement order of recording heads is not limited to the abovementioned example.

Each of the inkjet heads 14y, 14m, 14c, and 14k in the recording head 14 includes an energy generating unit (not shown) that generates energy for discharging ink droplets. The energy generating unit can be a piezoelectric actuator such as a piezoelectric element, a thermal actuator that makes use of phase transition caused by liquid film boiling using thermoelectric conversion element such as a heat-generating resistor, a shape-memory alloy actuator that makes use of metal phase transition caused by a change in temperature, or an electrostatic actuator that employs an electrostatic force.

Inside the main body 1, a feeding roller (semilunar roller) 21 and a separating pad (not shown) separate a single paper sheet 3 from the sheet stack in the paper feeding tray 4 and feed the separated paper sheet 3 toward the conveying unit 5.

The conveying unit 5 then guides the fed paper sheet 3 upward along a guiding surface 23a. The conveying unit 5 includes a conveyance guiding unit 23 that guides along a guiding surface 23b a paper sheet 3 that has been sent by the two-side unit 7, a conveying roller 24 that conveys a fed paper sheet 3, a pressure roller 25 that presses the fed paper sheet 3 against the conveying roller 24, a guiding member 26 that guides the fed paper sheet 3 toward the conveying roller 24, a guiding member 27 that guides a paper sheet 3 that has been conveyed in the reverse direction for duplex printing toward the two-side unit 7, and a pressing roller 28 that applies pressure on the paper sheet 3 that has rolled around the conveying roller 24.

In addition, the conveying unit 5 includes a conveying belt 33 that is stretched around a driving roller 31 and a driven roller 32. The conveying belt 33 is rotated such that the paper sheet 3 is conveyed in a horizontal plane beneath the recording head 14. The conveying unit 5 also includes a charging roller 34 that is used to charge the conveying belt 33, a guiding roller 35 that is disposed opposite to the charging roller 34, a guiding member (platen plate) (not shown) that guides the conveying belt 33 at a portion opposite to the image forming unit 2, and a cleaning roller (not shown) that is made of a porous material and that removes the recording liquid (ink) attached to the conveying belt 33.

The conveying belt 33 is an endless belt that, as described above, is stretched around the driving roller 31 and the driven roller 32 (tension roller). The conveying belt 33 is rotated in the counterclockwise direction, which is the conveying direction of the paper sheet 3, as shown by an arrow in FIG. 1.

The conveying belt 33 can have a single layer structure or a multilayer structure. An example of a two layer structure of the conveying belt 33 is shown in FIG. 4. The conveying belt 33 shown in FIG. 4 is made of a first layer (top layer) 33a and a second layer (bottom layer) 33b. The conveying belt 33 can be made from pure resin material having thickness of about 40 micrometers. The first layer 33a on which a paper sheet sticks can be made from pure ethylene tetrafluoroethylene (ETFE). The second layer 33b (middle resistance layer, grounding layer) can also be made from pure ETFE but with resistance control performed thereon using carbon.

The charging roller 34 abuts against the top layer of the conveying belt 33 and rotates due to the rotation of the conveying belt 33. To the charging roller 34 is applied a high voltage in a predetermined pattern from a high-tension circuit (high-voltage power supply) (described later).

Meanwhile, the conveying unit 5 includes a discharging roller 38 on the downstream side for discharging a paper sheet 3 with an image recorded thereon to the catch tray 6.

The conveying belt 33 rotates in the counterclockwise direction and gets positively charged due to the contact with the charging roller 34, to which a voltage of high potential is applied. In this case, the polarity of charging voltage applied by the charging roller 34 is switched at predetermined time intervals so as to charge the conveying belt 33 at a predetermined charging pitch.

When a paper sheet 3 is conveyed on the conveying belt 33 that has been charged at a high voltage, the inside of the conveyed paper sheet 3 is polarized and the surface of the paper sheet 3 making contact with the conveying belt 33 gets induced with a charge having opposite polarity to that of the conveying belt 33. Thus, the opposite charges on the conveying belt 33 and the paper sheet 3 electrostatically attract toward each other such that the paper sheet 3 is electrostatically held on the conveying belt 33. Because of that, any warpage or irregularity in the paper sheet 3 gets corrected so as to obtain a highly planar surface.

Figure 5:
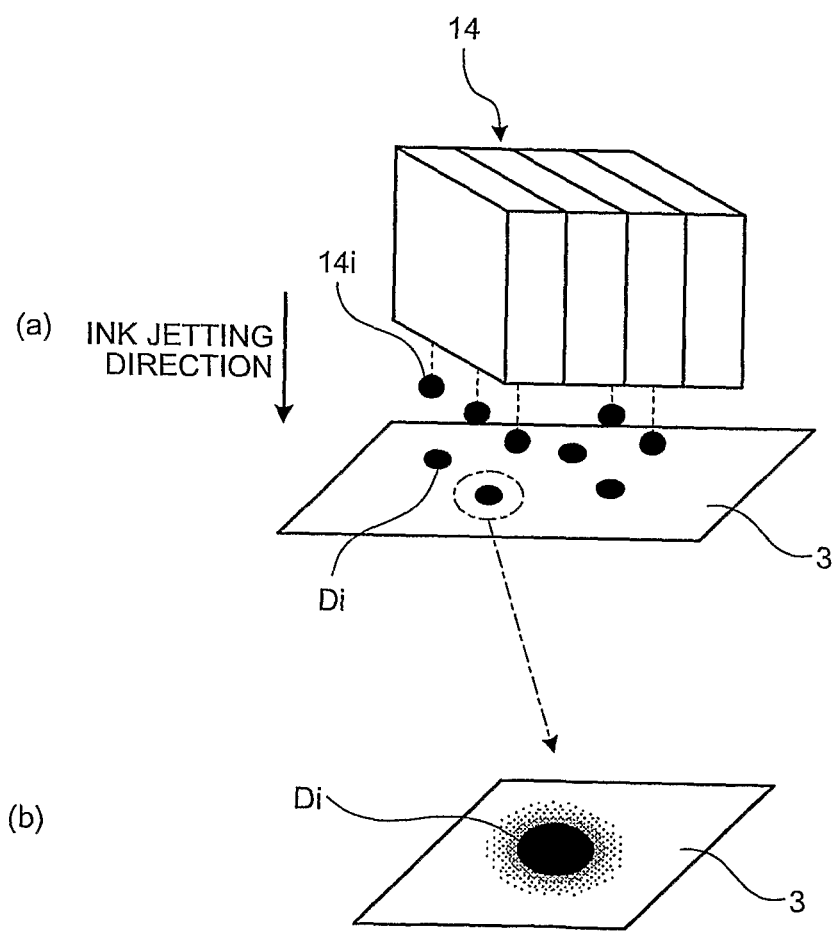
FIG. 5 is a schematic diagram 矢印 for explaining a recording operation performed in the inkjet recording apparatus.

Then, the conveying belt 33 is rotated to advance the paper sheet 3 by a predetermined distance. The carriage 13 is moved in one direction or moved back and forth to drive the recording head 14 according to an image signal. Subsequently, the recording head 14 discharges ink droplets 14i on the paper sheet 3 that is lying still on the conveying belt 33 (see FIG. 5). The ink droplets 14i fall on the paper sheet 3 to form ink dots Di in one recording line. After one recording line is recorded, the paper sheet 3 is advanced by a predetermined distance and the subsequent recording line is recorded thereon. Upon detection of a recording completion signal or a signal indicating that the rear edge of the paper sheet 3 has reached the recording area, the recording operation is completed. Meanwhile, (b) in FIG. 5 shows the dot forming region of an ink dot Di in a magnified form.

The paper sheet 3 with an image recorded thereon is then discharged to the catch tray 6 by the discharging roller 38.

Figure 6:
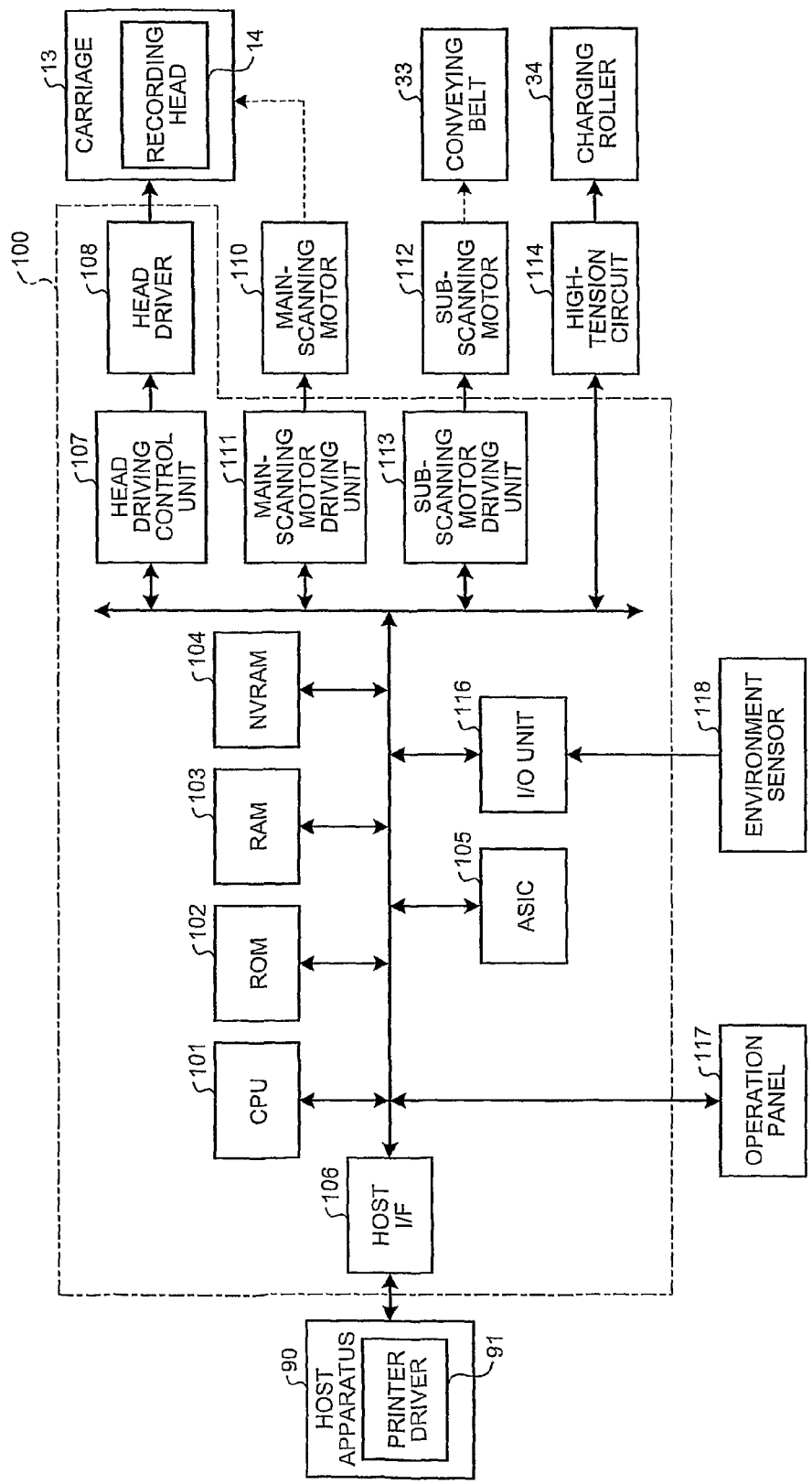
FIG. 6 is a block diagram of a control unit in the inkjet recording apparatus.

FIG. 6 is a block diagram of a control unit 100 in the inkjet recording apparatus. The control unit 100 includes a central processing unit (CPU) 101 that controls the operations of the inkjet recording apparatus in entirety, a read only memory (ROM) 102 that stores therein computer programs executed by the CPU 101 and certain fixed data, a random access memory (RAM) 103 that stores therein image data on a temporary basis, a non-volatile RAM (NVRAM) 104 that stores therein data even when the power to the inkjet recording apparatus is disconnected, and an application specific integrated circuit (ASIC) 105 that performs image processing such as signal processing and sorting or processes input-output signals used in controlling the inkjet recording apparatus in entirety.

In addition, the control unit 100 includes a host interface (I/F) 106 that enables communication of data and signals with a host apparatus 90, a head driving control unit 107 and a head driver 108 that are used to drive control the recording head 14, a main-scanning motor driving unit 111 that drives a main-scanning motor 110, a sub-scanning motor driving unit 113 that drives a sub-scanning motor 112, a subsystem driving unit (not shown) that drives a subsystem motor (not shown), an environment sensor 118 that detects the surrounding temperature and/or humidity, and an input/output (I/O) unit 116 for inputting detecting signals from a variety of sensors (not shown). The host apparatus 90 is a data processing apparatus such as a personal computer in which a printer driver 91 according to the present embodiment can be installed.

To the control unit 100 is attached an operation panel 117 that is used to input and display a variety of information. Meanwhile, the control unit 100 controls the switching ON and switching OFF of a high-tension circuit (high-voltage power supply) 114, which applies a high voltage to the charging roller 34, and performs switching control of the output polarity.

The control unit 100 receives print data including image data from the host apparatus 90 (e.g., a data processing apparatus such as a personal computer, an image reading apparatus such as an image scanner, or an imaging apparatus such as a digital camera) via the host I/F 106 through a cable or a network. The printer driver 91 installed in the host apparatus 90 generates and outputs the print data.

The CPU 101 reads the print data from a receive buffer of the host I/F 106, analyzes the print data, instructs the ASIC 105 to perform sorting of the print data, and sends image data to the head driving control unit 107. Herein, regarding the conversion of the print data into bitmap data for image outputting, it is assumed that the printer driver 91 expands image data as bitmap data and then sends the bitmap data to the inkjet recording apparatus. Alternatively, for example, it is possible to store font data in the ROM 102 and then perform conversion of the print data into bitmap data for image outputting.

The head driving control unit 107 receives image data (dot pattern data) equivalent to one recording line of the recording head 14, synchronizes the dot pattern data with a clock signal, and sends it as serial data to the head driver 108. In addition, the head driving control unit 107 sends a latch signal to the head driver 108 at a predetermined timing.

The head driving control unit 107 includes a ROM (not shown) (also possible to use the ROM 102) that stores therein pattern data of a driving waveform (driving signal), a waveform generating circuit (not shown) including a digital-to-analog (D/A) converting unit that converts the data of the driving waveform read from the ROM into analog data, and a driving waveform generating unit (not shown) including an amplifier.

The head driver 108 includes a shift register (not shown) that receives the clock signal and the image data in the form of serial data from the head driving control unit 107, a latch circuit (not shown) that latches a register value of the shift register with a latch signal output by the head driving control unit 107, a level converting circuit (level shifter) (not shown) that performs level conversion of the output value of the latch circuit, and an analog switch array (switching unit) (not shown) that is subjected to ON/OFF control by the level shifter. By performing ON/OFF control of the analog shift array, a predetermined driving waveform from among the driving waveforms is selectively applied to the energy generating unit of the recording head 14 so as to drive the recording head 14.

Figure 7:
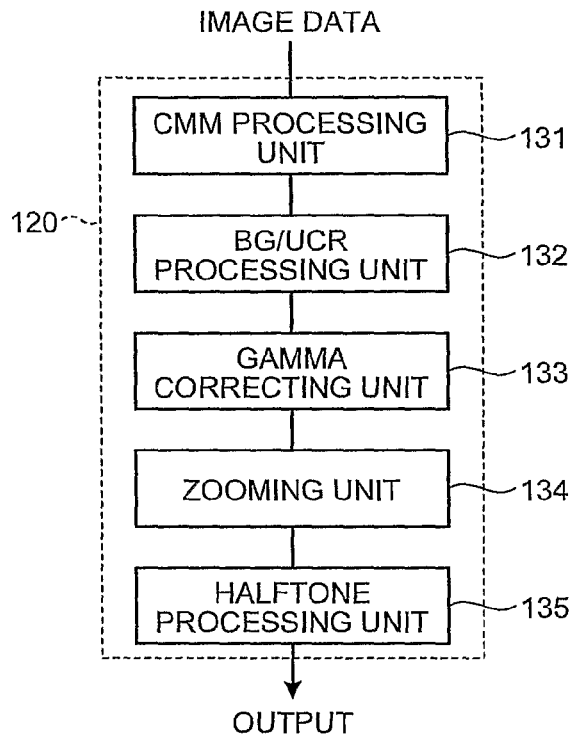
FIGS. 7 and 8 are schematic diagrams of exemplary configurations of a printer driver according to the present embodiment that is installed in a data processing apparatus.
Figure 8:
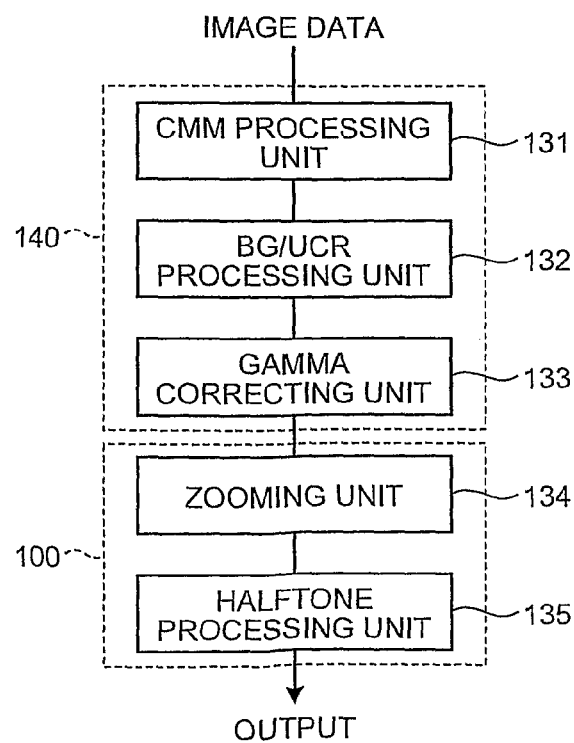

FIGS. 7 and 8 are schematic diagrams of exemplary configurations of the printer driver 91 installed in the host apparatus 90. As described above, the host apparatus 90 sends image data to the inkjet recording apparatus for image formation. In the configuration shown in FIG. 7, the printer driver 91 includes a color management module (CMM) processing unit 131, a black generation/under color removal (BG/UCR) processing unit 132, a gamma correcting unit 133, a zooming unit 134, and a halftone processing unit 135. The CMM processing unit 131 performs color space conversion on image data obtained from, for example, an application software. More particularly, with respect to the image data, the CMM processing unit 131 converts a color space for monitor display into a color space for the inkjet recording apparatus (i.e., conversion from RGB color system to CMY color system). The BG/UCR processing unit 132 performs black color generation and under color removal with respect to the CMY value of the image data. The gamma correcting unit 133 performs input-output correction according to the characteristics of the inkjet recording apparatus or the user preferences. The zooming unit 134 performs zooming in/zooming out operations on the post-gamma-correction image data according to the resolution of the inkjet recording apparatus. The halftone processing unit 135 includes a multiple value/small value matrix for converting the image data into a pattern arrangement of dots discharged in the inkjet recording apparatus.

In the configuration shown in FIG. 8, the printer driver 91 includes only the CMM processing unit 131, the BG/UCR processing unit 132, and the gamma correcting unit 133.

The zooming unit 134 and the halftone processing unit 135 are disposed in the control unit 100 of the inkjet recording apparatus. The zooming unit 134 performs zooming in/zooming out operations on post-gamma-correction image data according to the resolution of the inkjet recording apparatus. The halftone processing unit 135 includes a multiple value/small value matrix for converting the image data into a pattern arrangement of dots discharged in the inkjet recording apparatus.

In the exemplary configurations shown in FIGS. 7 and 8, the image data processed by the host apparatus 90 is formed in the RGB color system on the premise of displaying it on a monitor. Since the inkjet recording apparatus (e.g., a printer) processes data in the CMYK color system, the RGB image data needs to be converted into image data of the CMYK color system. For that, first, the CMM processing unit 131 performs conversion of the RGB image data into CMY image data. Then, the BG/UCR processing unit 132 generates black color data from the CMY image data.

The gamma correcting unit 133 performs gamma correction on each color component of CMYK image data for data refinement. During gamma correction, the CMYK image data is subjected to level adjustment according to the output characteristics of the inkjet recording apparatus and the user settings. The zooming unit 134 increases the resolution of the image data by subdividing the image data within each pixel on the monitor of the host apparatus 90. Since the amount of information represented within each pixel is greater for the monitor than for the inkjet recording apparatus, increasing the resolution of the image data enables the inkjet recording apparatus to compensate for the lacking information with dot density and properly express gradation in the output image.

The halftone processing unit 135 performs threshold matrix processing (halftone processing) on the multi-level image data (m-valued data) generated for monitor display to obtain multi-level image data (n1-valued data) or small-valued image data (n2-value data) that can be output by the inkjet recording apparatus (where, $m>n1 \geq n2 \geq 2$). Herein, it is assumed that certain dither processing using a threshold matrix (see FIGS. 9A to 9C) or certain error diffusion processing (see FIG. 10) is performed on the multiple value/small value matrix used by the halftone processing unit 135 such that the original multi-level image data is converted into dot ON/OFF data (ink discharging/non-discharging data).

Figure 9:
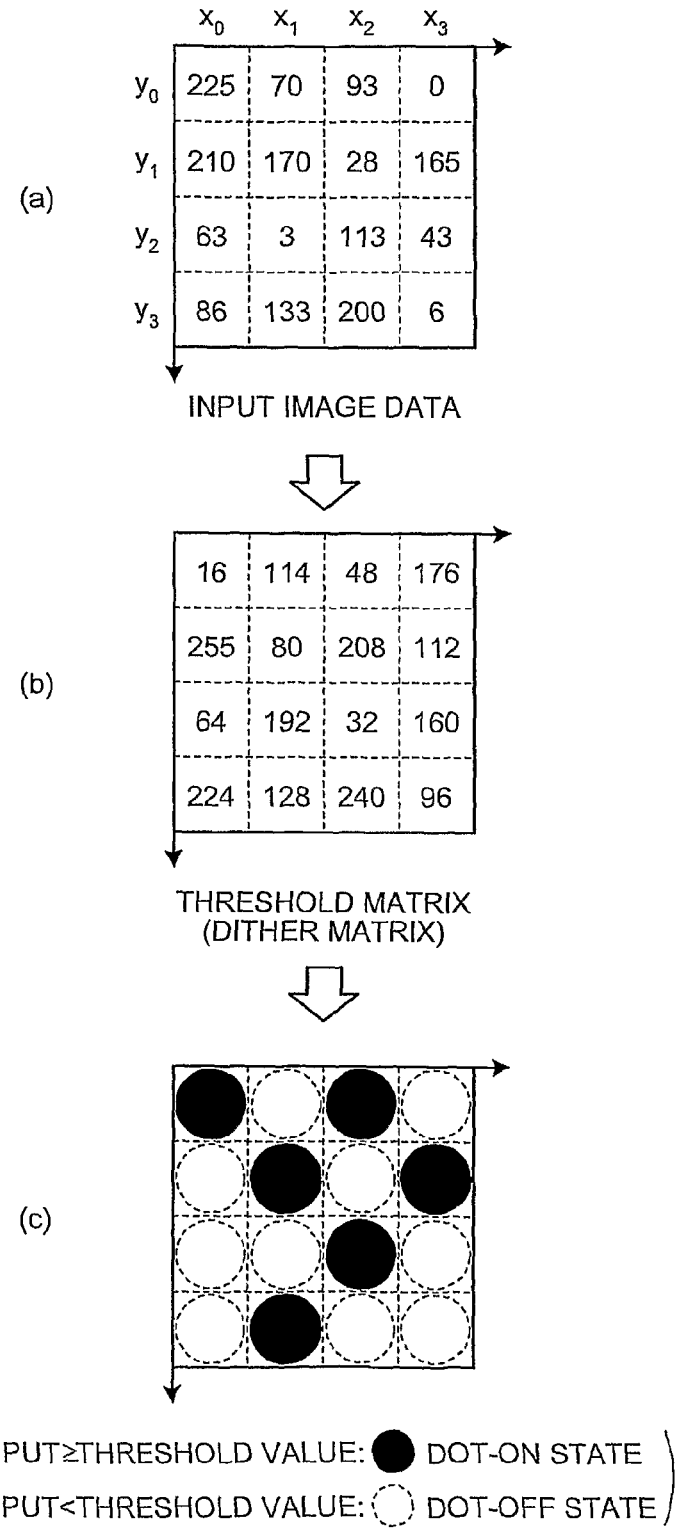
FIG. 9 is a schematic diagram for explaining halftone processing performed using dither processing.

In the dither processing shown in FIG. 9, the multi-level image data (see (a) in FIG. 9) is compared with a dither matrix (see (b) in FIG. 9) that is a threshold matrix generated by a predetermined method. Then, only those pixels in the image data that have the value equal to or more than (alternatively, equal to or less than) the corresponding threshold values are converted into dots. Meanwhile, the example indicated by (c) in FIG. 9 is given for the case of obtaining two-valued ON/OFF data. For small-valued data having more than two values, first, the reproducible gradation area can be divided according to, for example, the dot sizes such as small dots, medium dots, and large dots. Then, a threshold matrix corresponding to each dot size can be used for comparison with the input image data and dot conversion can be performed according to the comparison result.

The error diffusion processing shown in FIG. 10 is substantially complex than the dither processing. As indicated by the processing sequence in FIG. 10, threshold processing is performed with respect to each pixel and the error in each threshold processing is reflected at a predetermined ratio in the later calculation. Thus, the information that gets mandatorily discarded in the dither processing can be fed back to the output image by performing the error diffusion processing. That enables achieving enhancement in image quality (e.g., enhancement in resolution) as compared to the dither processing. Meanwhile, for processing of a target pixel in the error diffusion processing, it is necessary to refer to error data of the recording line that is two recording lines prior to the current recording line. Thus, it is necessary to store the data of at least three recording lines, the current recording line and the previous two recording lines, in a memory.

Figure 11:
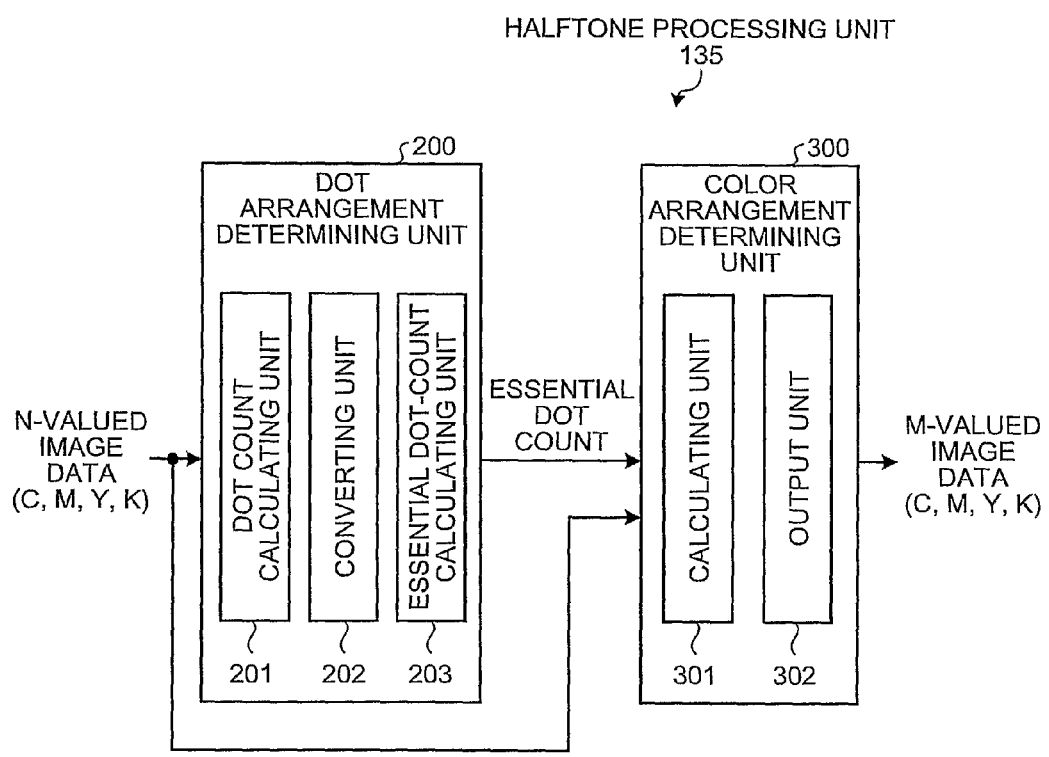
FIG. 11 is a schematic diagram of an exemplary functional configuration of a halftone processing unit according to the present embodiment.

Given below is the description of the error diffusion processing employed by the halftone processing unit 135 with reference to FIGS. 11 to 15. FIG. 11 is a schematic diagram of an exemplary functional configuration of the halftone processing unit 135. In the halftone processing unit 135, data (gradation data, gradation correction data, error data, etc.) corresponding to each pixel of at least three recording lines of multi-level image data is stored in a memory (not shown). As shown in FIG. 11, the halftone processing unit 135 includes a dot arrangement determining unit 200 and a color arrangement determining unit 300. The dot arrangement determining unit 200 determines, when multi-level image data of n colors (where, $n \geq 2$) is converted into multi-level image data of m colors (where, $n>m \geq 1$), an essential dot count or an essential quantity of recording material for the multi-level image data of m colors. The color arrangement determining unit 300 performs error diffusion processing with respect to each color component of the multi-level image data of n colors, calculates the dot count for each color component, and determines the arrangement of the calculated dot count for each color component within the range of the essential dot count determined by the dot arrangement determining unit 200. Meanwhile, in the following description, the dot count can be substituted by the quantity of recording material, which is calculated from the dot count. In that case, after determining the essential quantity of recording material, the arrangement of the quantity of recording material calculated for each color component can be determined within the range of the essential quantity of recording material.

The dot arrangement determining unit 200 includes a dot count calculating unit 201, a converting unit 202, and an essential dot-count calculating unit 203. The dot count calculating unit 201 calculates, based on gradation data of each color component in a target pixel of the multi-level image data of n colors, the dot count for each color component, and counts up the dot count for each color component to obtain the total dot count. The converting unit 202 converts the total dot count into gradation data. The essential dot-count calculating unit 203 performs error diffusion processing on the gradation data and calculates the essential dot count.

The color arrangement determining unit 300 includes a calculating unit 301 and an output unit 302. The calculating unit 301 calculates, for each color component in a target pixel of the multi-level image data of n colors, gradation correction data by adding gradation data of the corresponding color component and an error diffused from gradation data of the same color component in surrounding pixels that have already been quantized. The calculating unit 301 also calculates a threshold arrival factor of the gradation correction data. The threshold arrival factor indicates the percentage of the gradation correction data in the threshold value and can be expressed as {(gradation correction data obtained by error diffusion processing on gradation of each color component of the input image data/threshold value)×100}. The output unit 302 outputs, within the range of the essential dot count, the dots equivalent to the calculated dot count in the descending order of color components having higher threshold arrival factor. If the threshold arrival factor for each color component is identical, the dots are output in the descending order of color components having larger gradation correction data. Moreover, for color components having identical threshold arrival factor and identical gradation correction data, the output unit 302 can output the dots in the descending order of color components having more brightness, more recording material concentration, or lesser recording material intensity.

Figure 12:
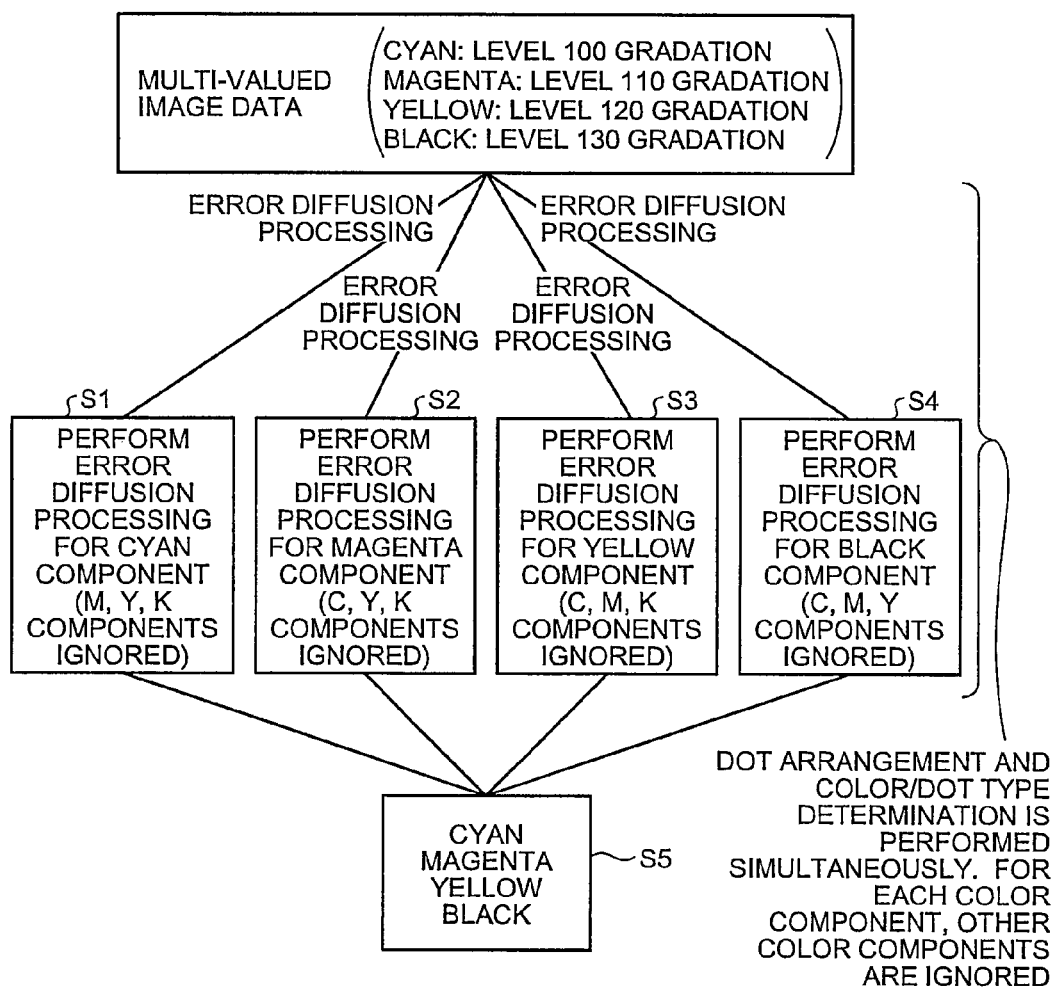
FIG. 12 is a schematic diagram for explaining dot dispersion using conventional error diffusion processing.

The error diffusion processing according to the present embodiment is described in comparison with conventional error diffusion processing. FIG. 12 is a schematic diagram for explaining dot dispersion using conventional error diffusion processing.

As shown in FIG. 12, conventional error diffusion processing is performed independently for each color component (C, M, Y, and K) of n number of colors ($n \geq 2$) to determine the dot arrangement and the dot type of the corresponding color component (Steps S1 to S4). The result of each error diffusion processing is combined to form the output image (Step S5). Since error diffusion processing is performed on each color component in an independent manner, it is possible to achieve high dispersibility for each color component. However, since dot dispersibility between the color components is not taken into consideration, synthesizing n number of colors causes color overlapping thereby affecting granularity.

In comparison, in the error diffusion processing according to the present embodiment, the dots for n number of colors are arranged according to a "dot arrangement of same dot count by one-dimensional error diffusion processing" and color overlapping is also taken into consideration. That enables achieving optimal dot dispersibility even after the colors are synthesized. Meanwhile, in the following description, the dot count can be substituted by the quantity of recording material that is calculated from the dot count.

Figure 13:
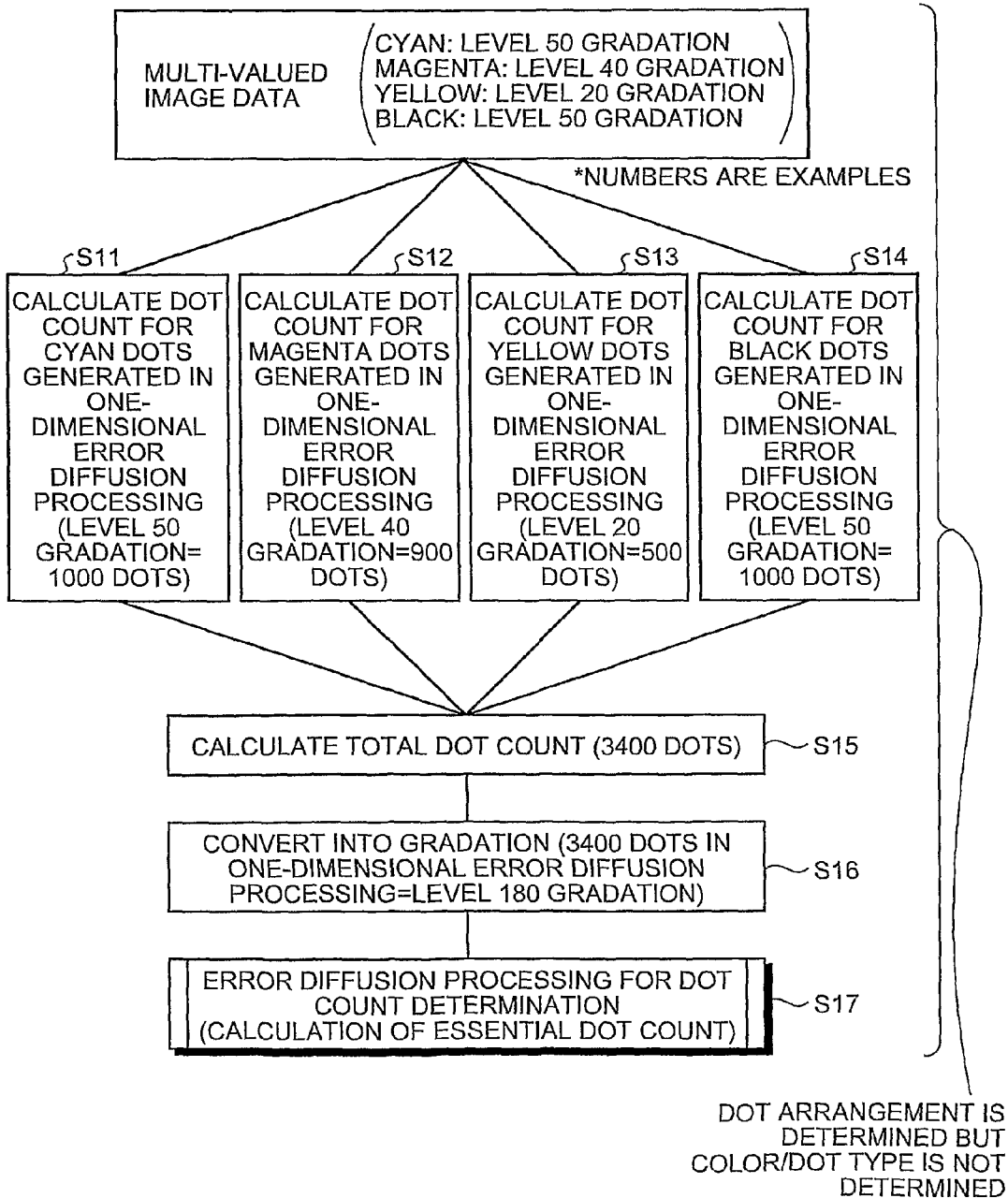
FIG. 13 is a flowchart for explaining a dot arrangement determining process.
Figure 14:
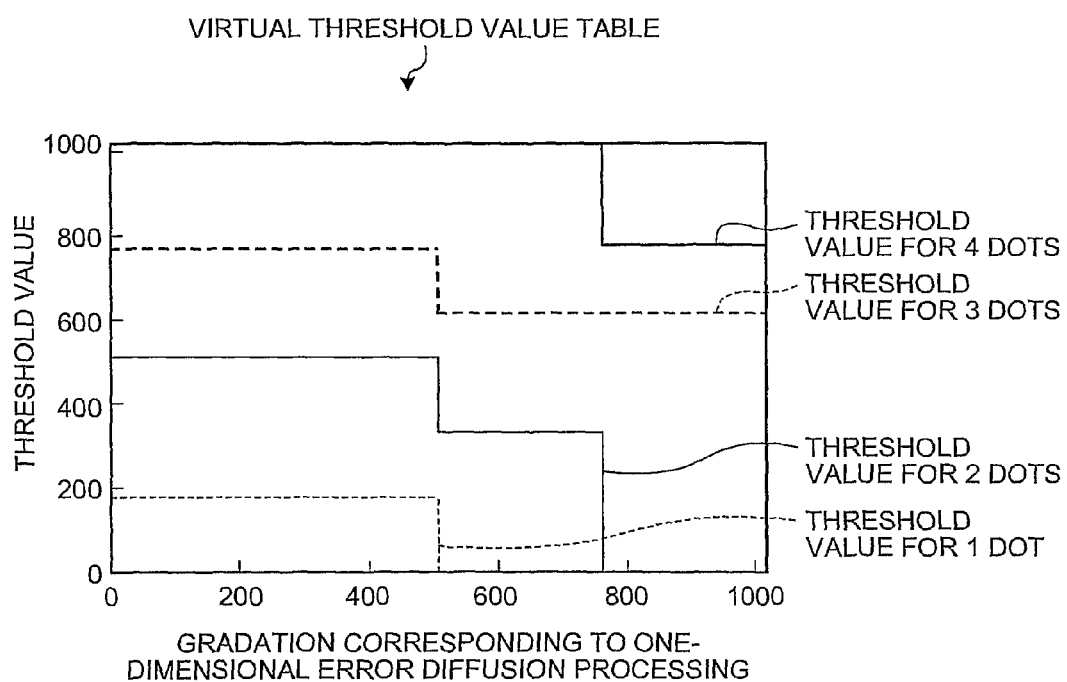
FIG. 14 is a schematic diagram of an exemplary virtual threshold value table.
Figure 15B:
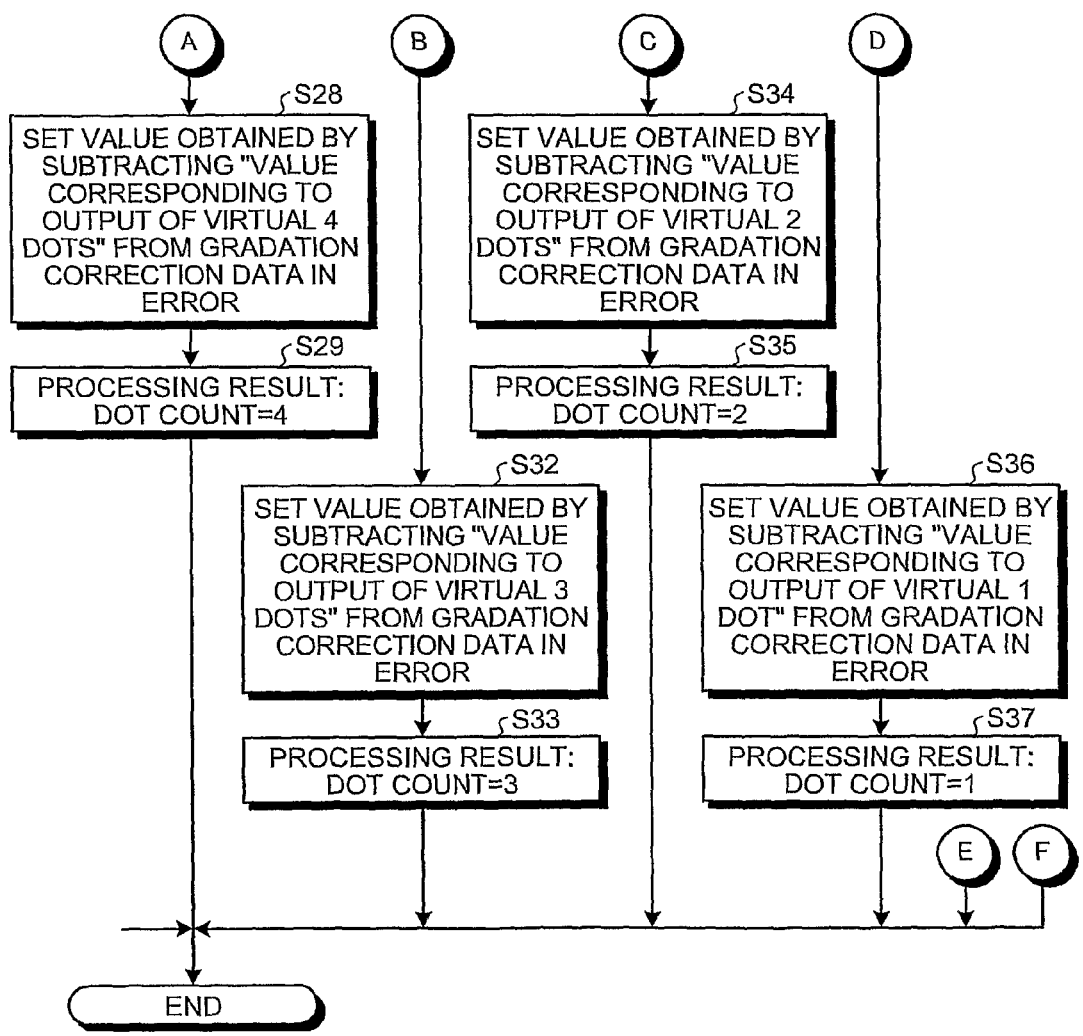
Figures 16, 17:
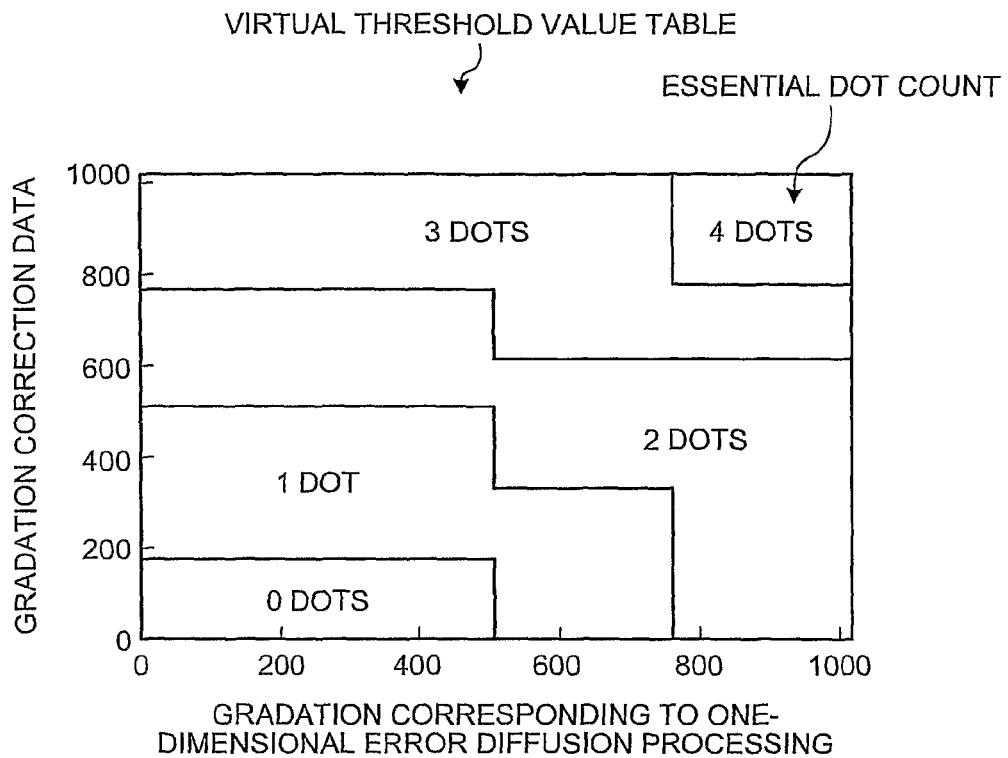
FIG. 16 is a schematic diagram of another exemplary virtual threshold value table.
FIG. 17 is a schematic diagram of exemplary data of a target pixel for which essential dot count is three.

The error diffusion processing according to the present embodiment includes a dot arrangement determining process and a color arrangement determining process. In the color arrangement determining process, the recording material is arranged according to the dot arrangement determined in the dot arrangement determining process. The dot arrangement determining process is described with reference to FIGS. 13 to 16. Since the dots for n or more number of colors are arranged according to the "dot arrangement of same dot count by one-dimensional error diffusion processing", the input gradation of the original dot arrangement of the n or more number of colors is converted into "gradation corresponding to one-dimensional error diffusion processing". For that, the gradation conversion is performed on the basis of the dot count. FIG. 13 is a flowchart for explaining the dot arrangement determining process. FIG. 14 is a schematic diagram of an exemplary virtual threshold value table. FIGS. 15A and 15B are flowcharts for explaining the error diffusion processing shown in FIG. 13 to enable dot arrangement determination. FIG. 16 is a schematic diagram of another exemplary virtual threshold value table.

With reference to FIG. 13, first, the halftone processing unit 135 refers to an internal dot count table and, based on input gradation for each of n number of color components in a target pixel (e.g., C=level 50 gradation, M=level 40 gradation, Y=level 20 gradation, and K=level 50 gradation), calculates the "dot count generated in one-dimensional error diffusion processing" for each color component (Steps S11 to S14). The "dot count generated in one-dimensional error diffusion processing" is the dot count per unit area (e.g., for an area of 48×48=2304 pixels) generated when one-dimensional error diffusion processing is performed under the assumption that the entire unit area is colored with the same gradation. In the dot count table, the input gradation and the "dot count generated in one-dimensional error diffusion processing" are stored in a corresponding manner. Herein, for each color component, the dot count is calculated based on the gradation level but irrespective of the dot type (e.g., 1000 dots for level 50 gradation of cyan (C), 900 dots for level 40 gradation of magenta (M), 500 dots for level 20 gradation of yellow (Y), and 100 dots for level 50 gradation of black (K)). Subsequently, the total dot count is obtained by counting up the dot count for each color component (3400 dots in the present example) (Step S15).

The halftone processing unit 135 then refers to a gradation reverse-conversion table and converts the total dot count into gradation (i.e., into gradation corresponding to one-dimensional error diffusion processing) (Step S16). The gradation corresponding to one-dimensional error diffusion processing is the combined gradation of all color components with the maximum value calculated as "gradation maximum value× number of color components". For example, for an 8-bit (gradation value: 0 to 255) four-color (CMYK) printer, the maximum value is 255×4=1020. In the dot arrangement determining process, the abovementioned gradation conversion is performed because the dots of four color components are processed as if the dots are of a single color component. In the gradation reverse-conversion table, the total dot count and the gradation corresponding to one-dimensional error diffusion processing are stored in a corresponding manner. As a result of the abovementioned processing, the gradation for two or more colors is calculated as the "gradation corresponding to one-dimensional error diffusion processing".

Lastly, the halftone processing unit 135 performs the error diffusion processing to determine the essential dot count (Step S17). More particularly, with a view to dot dispersion, the halftone processing unit 135 first performs the error diffusion processing on the gradation corresponding to one-dimensional error diffusion processing and generates gradation correction data. Then, the halftone processing unit 135 refers to the virtual threshold value table stored therein, reads the threshold value for each dot according to the gradation corresponding to one-dimensional error diffusion processing, compares each threshold value with the gradation correction data, and calculates the essential dot count (total dot count for C, M, Y, and K color components generated in the corresponding pixel).

In the virtual threshold value table shown in FIG. 14, the gradation corresponding to one-dimensional error diffusion processing and the threshold value for each dot count (one dot, two dots, three dots, and four dots) are stored in a corresponding manner. The threshold value for each dot count is not a fixed value but a variable that depends on the gradation corresponding to one-dimensional error diffusion processing. For example, if the gradation corresponding to one-dimensional error diffusion processing is level 600 gradation and the gradation correction data value is 200, the threshold value for each dot count corresponding to that gradation level is obtained by referring to the virtual threshold value table shown in FIG. 14 (i.e., threshold value for one dot=level 0 gradation, threshold value for two dots=level 330 gradation, threshold value for three dots=level 620 gradation, threshold value for four dots=level 1010 gradation). Then, the threshold value for each dot count is compared with the gradation correction data value (=200). Since the gradation correction data value (=200) is greater than the threshold value for one dot (=level 0 gradation) but smaller than the threshold value for two dots (=level 330 gradation), the essential dot count is determined to be one. Meanwhile, since the error diffusion processing with a view to dot dispersion is performed on color components that are different than the actual n number of color components, it is hereinafter referred to as a "virtual error diffusion processing". Moreover, in the virtual threshold value table, it is possible to use threshold values that are set based on the contents disclosed in Japanese Patent Application Laid-open No. 2000-270210 or Japanese Patent No. 3732470. Thus, the contents of Japanese Patent Application Laid-open No. 2000-270210 and Japanese Patent No. 3732470 are incorporated herein by reference.

In FIGS. 15A and 15B, it is assumed that each pixel in the input image data has a gradation value between level 0 gradation to level 1020 gradation and the dot count in each pixel of the output image data is between zero to four dots. First, it is determined whether the gradation corresponding to one-dimensional error diffusion processing (input gradation) has level 0 gradation (Step S21). If the input gradation has level 0 gradation (Yes at Step S21), the error for the current pixel position is set to zero (Step S30) and the essential dot count is determined to be zero (Step S31).

When the input gradation does not have level 0 gradation (No at Step S31), the gradation correction data is calculated based on the error in surrounding pixels (i.e., by performing the error diffusion processing on the input gradation) (Step S22) and the threshold values for one to four dots corresponding to the input gradation are obtained from the virtual threshold value table shown in FIG. 14 (Step S23).

Subsequently, it is determined whether the gradation correction data has a smaller value than the threshold value for one dot (Step S24). If the gradation correction data has a smaller value than the threshold value for one dot (Yes at Step S24), the gradation correction data value is set in the error (Step S38) and the essential dot count is set to zero (Step S39).

If the gradation correction data does not have a smaller value than the threshold value for one dot (No at Step S24), it is determined whether the gradation correction data has a smaller value than the threshold value for two dots (Step S25). If the gradation correction data has a smaller value than the threshold value for two dots (Yes at Step S25), a "value corresponding to output of hypothetical one dot" is subtracted from the gradation correction data value and the obtained value is set in the error (Step S36) and the essential dot count is set to one (Step S37). Meanwhile, the "value corresponding to output of hypothetical one dot" can be a fixed value or the threshold value for one dot corresponding to the input gradation.

If the gradation correction data does not have a smaller value than the threshold value for two dots (No at Step S25), it is determined whether the gradation correction data has a smaller value than the threshold value for three dots (Step S26). If the gradation correction data has a smaller value than the threshold value for three dots (Yes at Step S26), a "value corresponding to output of hypothetical two dots" is subtracted from the gradation correction data value and the obtained value is set as the error (Step S34) and the essential dot count is set to two (Step S35). Meanwhile, the "value corresponding to output of hypothetical two dots" can be a fixed value or the threshold value for two dots corresponding to the input gradation.

If the gradation correction data does not have a smaller value than the threshold value for three dots (No at Step S26), it is determined whether the gradation correction data has a smaller value than the threshold value for four dots (Step S27). If the gradation correction data has a smaller value than the threshold value for four dots (Yes at Step S27), a "value corresponding to output of hypothetical three dots" is subtracted from the gradation correction data value and the obtained value is set as the error (Step S32) and the essential dot count is set to three (Step S33). Meanwhile, the "value corresponding to output of hypothetical three dots" can be a fixed value or the threshold value for three dots corresponding to the input gradation.

If the gradation correction data does not have a smaller value than the threshold value for four dots (No at Step S27), a "value corresponding to output of hypothetical four dots" is subtracted from the gradation correction data value and the obtained value is set as the error (Step S28) and the essential dot count is set to four (Step S29). Meanwhile, the "value corresponding to output of hypothetical four dots" can be a fixed value or the threshold value for four dots corresponding to the input gradation. In this way, by performing the error diffusion processing in the abovementioned manner, it is possible to determine the essential dot count in a target pixel.

As shown in FIG. 16, the virtual threshold value table can also be configured to store the gradation value/the gradation correction data value corresponding to one-dimensional error diffusion processing and the area for each essential dot count (one dot, two dots, three dots, and four dots) in a corresponding manner. For example, in the virtual threshold value table shown in FIG. 16, if the gradation corresponding to one-dimensional error diffusion processing is level 600 gradation and the gradation correction data value is 200, the corresponding essential dot count is determined to be one.

Described below is the color arrangement determining process with reference to FIGS. 17 and 18. In the color arrangement determining process, the error diffusion processing is performed on each color component of the multi-level image data of n colors and the dot type (solid, small, medium, or large) for each color component is determined. In addition, the dot count for each color component is calculated based on the corresponding dot type. Herein, each of a small dot, a medium dot, and a large dot is counted as one, while a solid dot is counted as zero (no dot). For example, if the dot type of black (K) dots is large, the dot type of cyan (C) dots is small, and the dot types of magenta (M) and yellow (Y) dots are solid in a target pixel, then the dot count is calculated to be two. Subsequently, within the range of the essential dot count determined in the dot arrangement determining process, the dots equivalent to the calculated dot count are output in the descending order of color components having higher threshold arrival factor. That takes into consideration color overlapping for each color component. As described above, the threshold arrival factor is calculated as (gradation correction data obtained by error diffusion processing on gradation of each color component of the input image data/threshold value)×100%, where the threshold value corresponds to each dot diameter (small, medium, and large). If the threshold arrival factor for each color component is identical, then the dots equivalent to the calculated dot count are output in the descending order of color components having larger gradation correction data. FIG. 17 is a schematic diagram of exemplary data of a target pixel for which the essential dot count is three. Consider a case when, for the C, M, Y, and K color components, the gradation correction data values are 240, 226, 63, and 108, respectively; the threshold arrival factors are 100, 90, 70, and 60, respectively; and the dot diameters (threshold values) are large (240), large (240), small (90), and medium (180), respectively. In that case, the dots are output in the sequence of C, M, Y, and K color components because of the descending order of the respective threshold arrival factors. Meanwhile, for dot type determination, the processing on each color component (e.g., calculation of error in surrounding pixels, gradation correction, and dot type determination) is identical to the conventional error diffusion processing.

Since the error diffusion processing for each color component is performed with the same algorithm to that of the virtual error diffusion processing, sometimes the essential dot count obtained by the virtual error diffusion processing does not match with the total number of output dots calculated in the error diffusion processing for each color component depending on the input gradation/error in surrounding pixels.

In the dot arrangement determining process, dot dispersibility is taken into consideration while determining the dot count. Thus, outputting a larger or a smaller number of dots than the determined dot count affects dot dispersibility, dot configuration, and color configuration. To prevent such a situation, a dot stocking process is performed as given below.

Firstly, if the total number of output dots calculated in the error diffusion processing for each color component in a particular pixel is larger than the essential dot count, then the excess dots above the essential dot count cannot be output in that pixel. In that case, the dots equivalent to the calculated dot count are output in the descending order of color components having higher threshold arrival factor. However, if the excess dots are destroyed without ever outputting or output in the current pixel, then the dot count, dot configuration (solid dots, small dots, medium dots, large dots), and color configuration in the output image gets affected. Meanwhile, if the dot output is not performed, then the error for each color component goes on accumulating in an exceptional manner. Thus, the dot output is performed irrespective of the essential dot count, the error in surrounding pixels is subtracted, and the dot stocking process is performed such that the excess dots are stocked in a memory for outputting at an appropriate timing in subsequent processing.

When the total number of output dots calculated in the error diffusion processing for each color component is smaller than the essential dot count, the dots stocked in the memory during previous dot stocking process are used in the dot output. In that case, it is confirmed whether the dot stock is present for the surrounding pixels of a target pixel and, if present, the color/dot type of the dots in the dot stock for the surrounding pixels is retrieved in a certain order of priority. More particularly, the dots can be retrieved in the descending order of color components having larger threshold arrival factor. If the threshold arrival factor for each color component is identical, then the dots are retrieved in the descending order of color components having larger gradation correction data. If the threshold arrival factor and the gradation correction data for each color component are identical, then the dots are retrieved in the descending order of color components having more brightness, more recording material concentration, or lesser recording material intensity.

However, regarding color components of level 0 gradation or color components that have already been output, the dot output is not performed for the second time. If, even after retrieving the dot stock for surrounding pixels, the essential dot count is not met, then the dots having small size are mandatorily output in the descending order of color components having higher priority. Even in that case, the dot output regarding color components of level 0 gradation or color components that have already been output is not performed for the second time.

Figure 18:
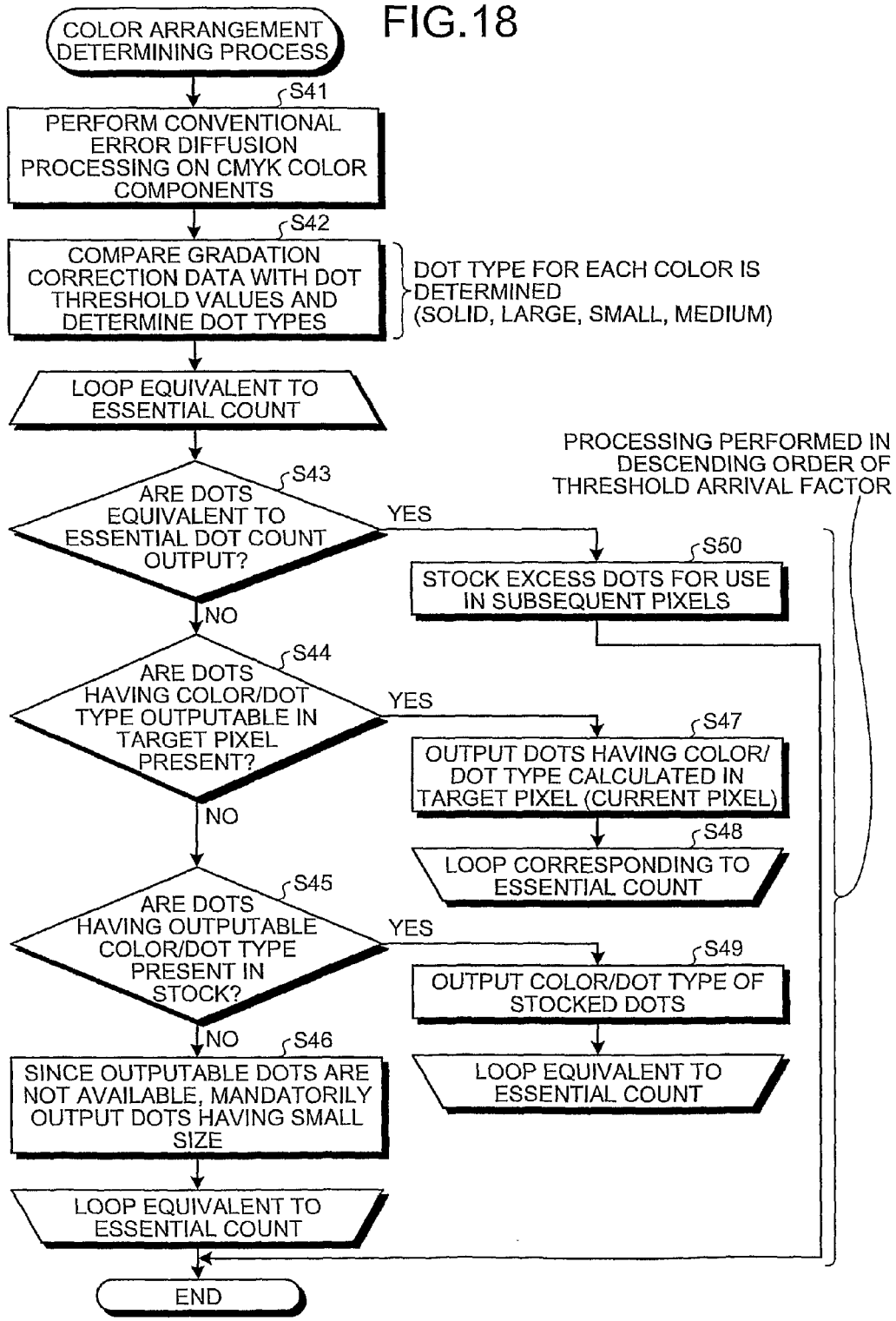
FIG. 18 is a flowchart for explaining a color arrangement determining process.

FIG. 18 is a flowchart for explaining an example of the color arrangement determining process. First, for each color component, the conventional error diffusion processing is performed on the input gradation value of each of the C, M, Y, and K color components (Step S41). Based on the input gradation values of the C, M, Y, and K color components, the threshold value is determined for each color component by referring to the virtual threshold value table. Then, error-dispersed gradation correction data is compared with each threshold value and the dot type (solid, small, medium, or large) for each color component is determined (Step S42).

Subsequently, it is determined whether dots equivalent to the essential dot count have been output (Step S43). If dots equivalent to the essential dot count have been output (Yes at Step S43), the excess dots are stocked for use in subsequent pixels (Step S50). For example, if the essential dot count is two and the total number of output dots calculated in the error diffusion processing for each color component is three (e.g., when the dot type of black (K) dots is large, the dot type of cyan (C) dots is medium, the dot type of magenta (M) dots is small, and the dot type of yellow (Y) dots is solid), then the excess dots (e.g., small dots of magenta (M)) are stocked for use in subsequent pixels.

On the other hand, if dots equivalent to the essential dot count are not yet output (No at Step S43), it is determined whether dots having the color/dot type outputable in the target pixel are present (Step S44). If such dots are present (Yes at Step S44), then the dots having the color/dot type calculated for the target pixel (current pixel) are output (Step S47) in the descending order of color components having larger threshold arrival factor. If the threshold arrival factor for each color component is identical, then the dots are output in the descending order of color components having larger gradation correction data. If the threshold arrival factor and the gradation correction data for each color component are identical, then the dots are output in the descending order of color components having more brightness, more recording material concentration, or lesser recording material intensity.

If dots having the color/dot type outputable in the target pixel are not present (No at Step S44), it is determined whether dots having the outputable color/dot type are stocked in the dot stock (Step S45). If such dots are stocked in the dot stock (Yes at Step S45), then those dots are output (Step S49) in the descending order of color components having larger threshold arrival factor. If the threshold arrival factor is identical, the dots are output in the descending order of color components having larger gradation correction data. If the threshold arrival factor and the gradation correction data for each color component are identical, then the dots are output in the descending order of color components having more brightness, more recording material concentration, or lesser recording material intensity.

On the other hand, if dots having the outputable color/dot type are not stocked (No at Step S45), then dots having small size are mandatorily output because outputable dots are not available (Step S46). Thus, by performing the abovementioned processing, it is possible to achieve optimal dispersibility in dot arrangement and color arrangement.

In this way, in the halftone processing unit 135 according to the present embodiment, the dot arrangement determining unit 200 determines the essential dot count when the multi-level image data of n colors (e.g., CMYK image data) is converted into multi-level image data of m colors (n>m≥1; e.g., m=1) by the error diffusion processing. The color arrangement determining unit 300 performs error diffusion processing with respect to each color component of the multi-level image data of n colors, calculates the dot count for each color component, and determines the arrangement of the calculated dot count for each color component within the range of the essential dot count determined by the dot arrangement determining unit 200. That enables achieving the dot arrangement corresponding to the multi-level image data of m colors, which is preferable than the dot arrangement corresponding to the multi-level image data of n colors. Because of the dot arrangement corresponding to the multi-level image data of m colors, the dot arrangement of all color components in multi-level image data of a color space having n or more colors can be dispersed in an optimal manner thereby preventing color overlapping for each color component.

In the dot arrangement determining unit 200, the dot count calculating unit 201 calculates, based on gradation data of each color component in a target pixel of the multi-level image data of n colors (n≥2), the dot count for each color component, and counts up the dot count for each color component to obtain the total dot count. Then, the converting unit 202 converts the total dot count into gradation data and the essential dot-count calculating unit 203 performs error diffusion processing on the gradation data and calculates the essential dot count. Thus, the dot arrangement corresponding to the multi-level image data of m colors can be set by using the total dot count calculated from the input gradation for each color of the n colors. As a result, for a particular dot count in the n colors, dot arrangement can be performed corresponding to the m colors.

In the color arrangement determining unit 300, the calculating unit 301 calculates, for each color component, the threshold arrival factor indicating the percentage of the gradation correction data in the threshold value. Then, the output unit 302 outputs, within the range of the essential dot count determined by the dot arrangement determining unit 200, the dots equivalent to the calculated dot count in the descending order of color components having higher threshold arrival factor. If the threshold arrival factor for each color component is identical, the dots are output in the descending order of color components having larger gradation correction data. If the threshold arrival factor and the gradation correction data for each color component are identical, the dots are output in the descending order of color components having more brightness, more recording material concentration, or lesser recording material intensity. Thus, by arranging the color components in the descending order of the percentage of the sum of the input gradation value and the error value in the threshold value, it becomes possible to arrange the color of highest priority (color closest to the threshold value) in an optimal manner.

Meanwhile, the inkjet recording apparatus according to the present embodiment can be installed in a system including a plurality of other devices such as a host computer, an interface device, a scanner, and a printer or can be installed in a system including only a single other device such as a host computer.

Moreover, a computer-readable storage medium can be used to store a program code of a software application that administers the abovementioned operations in the inkjet recording apparatus. The program code can then be loaded in a computer (alternatively, a CPU, a micro processing unit (MPU), or a digital signal processor (DSP)) of a system or an apparatus such that the computer can execute the instructions given in the program code. Thus, the program code, which is loaded from a storage medium, is executed to perform the operations in the inkjet recording apparatus. The program code or the storage medium used to store the program code falls within the scope of the above embodiment. The storage medium can be an optical recording medium, a magnetic recording medium, a magnetic optical recording medium, or a semiconductor recording medium, such as a floppy disk (FD), a hard disk (HD), an optical disk, a magnetic optical disk, a compact disk read only memory (CD-ROM), a compact disk recordable (CD-R), a magnetic tape, a nonvolatile memory card, a read only memory (ROM).

As described above, the computer executes the instructions given in the program code to perform the operations in the inkjet recording apparatus. That includes the case when an operating system (OS) running on the computer executes the instructions given in the program code and performs, in part or in whole, the operations in the inkjet recording apparatus.

The program code loaded from the storage medium can be written into a memory disposed in a function expansion board that is installed inside the computer or in a function expansion unit that is connected to the computer. In that case, a CPU in the function expansion board or the function expansion unit executes the instructions given in the program code and performs, in part or in whole, the operations in the inkjet recording apparatus.

Although the description in the present embodiment is given for an inkjet recording apparatus, the description is also applicable to other image forming apparatuses such as a printer, a facsimileing apparatus, a copying apparatus, and a multifunction product (MFP) with printing, facsimileing, and copying functionality. Moreover, the abovementioned description is also applicable to an image forming apparatus using a recording liquid other than ink, or a data processing apparatus that provides print data to that image forming apparatus, or a printer driver installed in the data processing apparatus.

The invention claimed is:

1. An image processing apparatus that quantizes multi-level image data of n colors, where $n \geq 2$, by an error diffusion processing, the image processing apparatus comprising:
a dot arrangement determining unit that performs the error diffusion processing by determining either one of an essential dot count and an essential recording material amount when the multi-level image data of n colors is converted into multi-level image data of m colors, where $n>m \geq 1$, by the error diffusion processing; and
a color arrangement determining unit that performs the error diffusion processing on each color component of the multi-level image data of n colors, calculates either one of a dot count and a recording material amount for each color component, and determines an arrangement of either one of the dot count and the recording material amount for each color component within a range of a corresponding one of the essential dot count and the essential recording material amount determined by the dot arrangement determining unit.

2. The image processing apparatus according to claim 1, wherein a gradation level of each color component of the multi-level image data of n colors is smaller than a gradation level of the multi-level image data of m colors.

3. The image processing apparatus according to claim 1, wherein the dot arrangement determining unit includes
a dot count calculating unit that calculates a total dot count by calculating a dot count for each color component and counting up the dot count for each color, based on gradation data of each color in a target pixel of the multi-level image data of n colors,
a converting unit that converts the total dot count into gradation data, and
an essential dot count calculating unit that calculates an essential dot count by performing the error diffusion processing on the gradation data obtained by converting the total dot count.

4. The image processing apparatus according to claim 1, wherein the color arrangement determining unit includes
a calculating unit that calculates gradation correction data by adding gradation data of corresponding color component and an error diffused from gradation data of the corresponding color component in surrounding pixels that have already been quantized, and calculates a ratio of calculated gradation correction data to a threshold as a threshold arrival factor, for each color component in a target pixel of the multi-level image data of n colors, and
an output unit that outputs the dot count within the range of the essential dot count in a descending order from a color component having a largest threshold arrival factor.

5. The image processing apparatus according to claim 4, wherein when the color components have a same threshold arrival factor, the output unit outputs the dot count within the range of the essential dot count in a descending order from a color component having largest gradation correction data.

6. The image processing apparatus according to claim 5, wherein when the color components have a threshold arrival factor and same gradation correction data, the output unit outputs the dot count from a color component having any one of highest brightness, highest recording material concentration, and lowest recording material lightness.

7. An image processing method of operating a computer to quantize multi-level image data of n colors, where $n \geq 2$, by an error diffusion processing, the image processing method comprising:
dot arrangement determining including operating the computer to perform the error diffusion processing by determining either one of an essential dot count and an essential recording material amount when the multi-level image data of n colors is converted into multi-level image data of m colors, where $n>m \geq 1$, by the error diffusion processing; and
color arrangement determining including operating the computer to
perform the error diffusion processing on each color component of the multi-level image data of n colors,
calculate either one of a dot count and a recording material amount for each color component, and determine an arrangement of either one of the dot count and the recording material amount for each color component within a range of a corresponding one of the essential dot count and the essential recording material amount determined at the dot arrangement determining.

8. A computer program product comprising a non-transitory computer-usable medium having computer-readable program codes embodied in the medium for quantizing multi-level image data of n colors, where $n \geq 2$, by an error diffusion processing, the program codes when executed causing a computer to execute:

dot arrangement determining including performing the error diffusion processing by determining either one of an essential dot count and an essential recording material amount when the multi-level image data of n colors is converted into multi-level image data of m colors, where $n > m \geq 1$, by the error diffusion processing; and color arrangement determining including
performing the error diffusion processing on each color component of the multi-level image data of n colors, calculating either one of a dot count and a recording material amount for each color component, and determining an arrangement of either one of the dot count and the recording material amount for each color component within a range of a corresponding one of the essential dot count and the essential recording material amount determined at the dot arrangement determining.

* * * * *